United States Patent
Millman

(10) Patent No.: US 8,395,626 B2
(45) Date of Patent: Mar. 12, 2013

(54) METHOD AND SYSTEM FOR INTERACTIVE SIMULATION OF MATERIALS

(76) Inventor: Alan Millman, Oak Park, IL (US)

(*) Notice: Subject to any disclaimer, the term of this patent is extended or adjusted under 35 U.S.C. 154(b) by 985 days.

(21) Appl. No.: 11/784,455

(22) Filed: Apr. 6, 2007

(65) Prior Publication Data

US 2007/0239409 A1 Oct. 11, 2007

Related U.S. Application Data

(60) Provisional application No. 60/790,093, filed on Apr. 8, 2006.

(51) Int. Cl.
 *G06T 13/00* (2011.01)
 *G09B 23/28* (2006.01)

(52) U.S. Cl. .......... 345/473; 345/475; 345/474; 434/262

(58) Field of Classification Search .......... 345/473–475, 345/419; 434/262
 See application file for complete search history.

(56) References Cited

U.S. PATENT DOCUMENTS

| | | | |
|---|---|---|---|
| 3,775,865 A | 12/1973 | Rowan | |
| 4,321,047 A | 3/1982 | Landis | |
| 4,789,340 A | 12/1988 | Zikria | |
| 4,907,973 A | 3/1990 | Hon | |
| 5,055,051 A | 10/1991 | Duncan | |
| 5,061,187 A | 10/1991 | Jerath | |
| 5,149,270 A | 9/1992 | McKeown | |
| 5,687,259 A | 11/1997 | Linford | |
| 5,722,836 A | 3/1998 | Younker | |
| 5,736,991 A | 4/1998 | Tada | |
| 5,755,577 A | 5/1998 | Gillio | |
| 5,766,016 A | 6/1998 | Sinclair | |
| 5,768,134 A | 6/1998 | Swaelens | |
| 5,774,175 A | 6/1998 | Hattori | |
| 5,785,531 A | 7/1998 | Leung | |
| 5,791,908 A | 8/1998 | Gillio | |
| 5,800,177 A | 9/1998 | Gillio | |
| 5,800,178 A | 9/1998 | Gillio | |
| 5,825,941 A | 10/1998 | Linford | |
| 5,835,693 A | 11/1998 | Lynch | |
| 5,854,850 A | 12/1998 | Linford | |
| 5,855,553 A | 1/1999 | Tajima | |
| 5,871,018 A | 2/1999 | Delp | |
| 5,873,732 A | 2/1999 | Hasson | |
| 5,882,206 A | 3/1999 | Gillio | |
| 5,912,675 A * | 6/1999 | Laperriere | 345/473 |
| 5,947,743 A | 9/1999 | Hasson | |
| 5,947,744 A | 9/1999 | Izzat | |
| 5,956,040 A | 9/1999 | Asano | |

(Continued)

FOREIGN PATENT DOCUMENTS

WO  WO 01/59710 A1  8/2001

OTHER PUBLICATIONS

Kecskemethy A, Lange C, Grabner G. Object-oriented modeling of multibody dynamics including impacts, ECCM-2001, Cracow, Poland: Jun. 26-29, 2001, pp. 1-28.*

(Continued)

*Primary Examiner* — Kee M Tung
*Assistant Examiner* — Zhengxi Liu
(74) *Attorney, Agent, or Firm* — Lesavich High-Tech Law Group, P.C.; Stephen Lesavich

(57) ABSTRACT

A method and system for interactive simulation of materials. The method and system provide flexible simulation, the ability to combine rigid and flexible simulation, a collision-detection method for simulating objects and other entities, and a system for displaying and interacting with simulated objects which includes a harness for registering the hardware components of the simulation with respect to each other.

30 Claims, 15 Drawing Sheets

U.S. PATENT DOCUMENTS

| | | | |
|---|---|---|---|
| 5,974,073 A | 10/1999 | Cannard | |
| 5,978,523 A | 11/1999 | Linford | |
| 6,049,622 A | 4/2000 | Robb | |
| 6,057,859 A * | 5/2000 | Handelman et al. | 345/474 |
| 6,069,634 A | 5/2000 | Gibson | |
| 6,074,213 A | 6/2000 | Hon | |
| 6,077,082 A | 6/2000 | Gibson | |
| 6,081,611 A | 6/2000 | Linford | |
| 6,102,698 A | 8/2000 | Staples | |
| 6,106,301 A | 8/2000 | Merril | |
| 6,113,395 A | 9/2000 | Hon | |
| 6,217,530 B1 | 4/2001 | Martin | |
| 6,240,375 B1 | 5/2001 | Sonoda | |
| 6,287,748 B1 | 9/2001 | Lawton | |
| 6,323,837 B1 | 11/2001 | Rosenberg | |
| 6,332,903 B1 | 12/2001 | Otani | |
| 6,336,812 B1 | 1/2002 | Cooper | |
| 6,347,460 B1 | 2/2002 | Forrer | |
| 6,353,677 B1 | 3/2002 | Pfister | |
| 6,353,768 B1 | 3/2002 | Karafillis | |
| 6,356,807 B1 | 3/2002 | McGee | |
| 6,377,011 B1 | 4/2002 | Ben-Ur | |
| 6,379,866 B2 | 4/2002 | Lawton | |
| 6,385,509 B2 | 5/2002 | Das | |
| 6,403,004 B1 | 6/2002 | Stecker | |
| 6,405,158 B1 | 6/2002 | Massie | |
| 6,448,968 B1 * | 9/2002 | Pfister et al. | 345/423 |
| 6,463,356 B1 | 10/2002 | Hattori | |
| 6,470,302 B1 | 10/2002 | Cunningham | |
| 6,488,507 B1 | 12/2002 | Stoloff | |
| 6,500,133 B2 | 12/2002 | Martin | |
| 6,512,516 B1 * | 1/2003 | Schill et al. | 345/424 |
| 6,537,729 B1 | 3/2003 | Lawton | |
| 6,538,634 B1 | 3/2003 | Chui | |
| 6,556,256 B1 * | 4/2003 | Kato et al. | 348/781 |
| 6,654,000 B2 | 11/2003 | Rosenberg | |
| 6,659,776 B1 | 12/2003 | Aumann | |
| 6,666,835 B2 | 12/2003 | Martin | |
| 6,671,651 B2 * | 12/2003 | Goodwin et al. | 702/152 |
| 6,681,141 B2 | 1/2004 | Ferreri | |
| 6,683,985 B1 | 1/2004 | Kase | |
| 6,704,694 B1 | 3/2004 | Basdogan | |
| 6,708,142 B1 * | 3/2004 | Baillot et al. | 703/2 |
| 6,714,901 B1 | 3/2004 | Cotin | |
| 6,727,043 B2 | 4/2004 | Lawton | |
| 6,749,976 B2 | 6/2004 | Lawton | |
| 6,762,002 B2 | 7/2004 | Lawton | |
| 6,805,492 B2 | 10/2004 | Hashimoto | |
| 6,813,924 B1 | 11/2004 | Van Der Aa | |
| 6,816,820 B1 | 11/2004 | Friedl | |
| 6,817,530 B2 | 11/2004 | Labrec | |
| 6,832,131 B2 | 12/2004 | Hattori | |
| 6,857,878 B1 | 2/2005 | Chosack | |
| 6,863,536 B1 | 3/2005 | Fisher | |
| 6,912,449 B2 | 6/2005 | Sabe | |
| 6,929,481 B1 | 8/2005 | Alexander | |
| 6,963,792 B1 * | 11/2005 | Green | 700/251 |
| 6,970,171 B2 * | 11/2005 | Baraff et al. | 345/473 |
| 7,013,201 B2 | 3/2006 | Hattori | |
| 7,023,423 B2 | 4/2006 | Rosenberg | |
| 7,121,832 B2 | 10/2006 | Hsieh | |
| 7,202,851 B2 | 4/2007 | Cunningham | |
| 7,215,326 B2 | 5/2007 | Rosenberg | |
| 7,239,992 B2 | 7/2007 | Ayache | |
| 7,249,951 B2 | 7/2007 | Bevirt | |
| 7,261,565 B2 | 8/2007 | Chosack | |
| 7,277,833 B2 | 10/2007 | Kukuk | |
| 7,280,095 B2 | 10/2007 | Grant | |
| 7,291,016 B2 | 11/2007 | Otto | |
| 7,292,716 B2 | 11/2007 | Kim | |
| 7,297,390 B2 | 11/2007 | Simmons | |
| 7,298,374 B2 | 11/2007 | Styles | |
| 7,307,619 B2 | 12/2007 | Cunningham | |
| 7,308,831 B2 | 12/2007 | Cunningham | |
| 7,333,111 B2 * | 2/2008 | Ng-Thow-Hing et al. | 345/473 |
| 7,812,815 B2 * | 10/2010 | Banerjee et al. | 345/156 |
| 2002/0035458 A1 | 3/2002 | Kim et al. | |
| 2002/0042703 A1 * | 4/2002 | Furusu et al. | 703/11 |
| 2002/0161026 A1 | 10/2002 | Paralkar | |
| 2002/0168618 A1 * | 11/2002 | Anderson et al. | 434/262 |
| 2002/0180739 A1 * | 12/2002 | Reynolds et al. | 345/474 |
| 2003/0088389 A1 | 5/2003 | Balaniuk et al. | |
| 2003/0091967 A1 * | 5/2003 | Chosack et al. | 434/262 |
| 2003/0182091 A1 | 9/2003 | Kukuk | |
| 2004/0021660 A1 * | 2/2004 | Ng-Thow-Hing et al. | 345/419 |
| 2004/0024311 A1 * | 2/2004 | Quaid, III | 600/428 |
| 2004/0043368 A1 | 3/2004 | Hsieh et al. | |
| 2004/0252872 A1 | 12/2004 | Tsai et al. | |
| 2004/0254566 A1 | 12/2004 | Plicchi et al. | |
| 2004/0254771 A1 | 12/2004 | Riener et al. | |
| 2004/0259057 A1 | 12/2004 | Kim | |
| 2005/0010326 A1 | 1/2005 | Hayward et al. | |
| 2005/0024331 A1 | 2/2005 | Berkley et al. | |
| 2005/0032028 A1 * | 2/2005 | Chosack et al. | 434/262 |
| 2005/0046629 A1 * | 3/2005 | Jeong et al. | 345/473 |
| 2005/0196741 A1 | 9/2005 | Otto | |
| 2005/0197800 A1 * | 9/2005 | Goodwin et al. | 702/152 |
| 2005/0232511 A1 | 10/2005 | Ziou et al. | |
| 2006/0013505 A1 | 1/2006 | Yau et al. | |
| 2006/0099557 A1 | 5/2006 | Hyltander et al. | |
| 2006/0129719 A1 | 6/2006 | Cruz-Hernandez et al. | |
| 2006/0209019 A1 | 9/2006 | Hu | |
| 2006/0290695 A1 | 12/2006 | Salomie | |
| 2007/0072144 A1 | 3/2007 | Imgrund et al. | |
| 2007/0191741 A1 | 8/2007 | Tsai et al. | |

OTHER PUBLICATIONS

Chadwick, et al., 1989, "Layered construction for deformable animated characters", Proceedings of the 16th Annual Conference on Computer Graphics and interactive Techniques SIGGRAPH '89, ACM, New York, NY, pp. 243-252.*

Roland S. Burns, "Advanced Control Engineering", Butterworth-Heinemann 2nd edition, Nov. 2001, 39 pages.*

Dachille, et al., "Haptic sculpting of dynamic surfaces", Proceedings of the 1999 Symposium on interactive 3D Graphics, Apr. 26-29, 1999, I3D '99, ACM, New York, NY, pp. 103-110.*

Arthur, et al., "Designing and Building the PIT: a Head Tracked Stereo Workspace for Two Users", Second International Immersive Projection Technology Workshop, May 11-12, 1998, pp. 1-10.*

Picinbono et al., "Improving realism of a surgery simulator: Linear Anisotropic Elasticity, Complex Interactions and Force Extrapolation", Technical Report No. 4018, INRIA, Sep. 2000, 40 pages.*

Stephane Cotin, Herve Delingette, and Nicholas Ayache, Realtime elastic deformations of soft tissues for surgery simulation, IEEE Transactions on Visualization and Computer Graphics, vol. 5, Issue 1, Jan. 1999, pp. 62-73.*

Denneman et al., "Rheological Modeling with Hookean Bead-Spring Cubes (SC, BBC and FCC)", vol. 34, Issue 1, pp. 75-95, Jul. 1998.*

G. Hamarneh and T. McInerney, "Physics-based shape deformations for medical image analysis," Image Processing: Algorithms and Systems II 5014(1), pp. 354-362, SPIE, 2003.*

Kelvin Element definition downloaded from the web, last updated Jan. 11, 1995, 1 page, http://web.mst.edu/~wlf/Mechanical/Kelvin.html.*

Learoyd, et al., "Alterations with Age in the Viscoelastic Properties of Human Arterial Walls", Circulation Research, vol. XVIII, Mar. 1966, 16 pages.*

P. Meseure; C. Chaillou, "A deformable body model for surgical simulation", The Journal of Visualization and Computer Animation, vol. 11, No. 4, pp. 197-208, Oct. 3, 2000, Copyright © 2000 John Wiley & Sons, Ltd.*

R. Keith Mobley, "An Introduction to Predictive Maintenance, 2nd Edition", Butterworth-Heinemann, Oct. 2002, 45 pages.*

Luciano, C., Banerjee, P., Florea, L., Dawe, G., Nov. 14-16, 2005, "Design of the ImmersiveTouch™: a High-Performance Haptic Augmented VR System", Proceedings of Human-Computer Interaction, 10 pages.*

J.D. Mulder and R. van Liere, "The personal space station: Bringing interaction within reach", S. Richer, P. Richard, and B. Taravel, editors, Proceedings of the Virtual Reality International Conference, VRIC 2002, pp. 73-81, Mar. 2002.*

Sarah F. Gibson, Apr. 1997, "3D chainmail: a fast algorithm for deforming volumetric objects", Proceedings of the 1997 symposium on Interactive 3D graphics, (I3D '97), ACM, New York, NY, USA, 149-ff.*

Hills, J.W.; Jensen, J.F., "Telepresence technology in medicine: principles and applications ," Proceedings of the IEEE , vol. 86, No. 3, pp. 569-580, Mar. 1998.*

U. Meier, O. Lopez, C. Monserrat, M. Juan, and M. Alcaniz, "Real-time deformable models for surgery simulation: a survey", Computer Methods and Programs in Biomedicine, vol. 77, Issue 3, pp. 183-197, Mar. 2005.*

Jurriaan D. Mulder, Jack Jansen, and Arjen van Rhijn, May 22-23, 2003, "An affordable optical head tracking system for desktop VR/AR systems", Proceedings of the workshop on Virtual environments 2003, (EGVE '03), ACM, New York, NY, USA, pp. 215-223.*

Joanna L. Power, A. J. Bernheim Brush, Przemyslaw Prusinkiewicz, and David H. Salesin. 1999. Interactive arrangement of botanical L-system models. In Proceedings of the 1999 symposium on Interactive 3D graphics (I3D '99). ACM, New York, NY, USA, 175-182.*

Eva-Lotta Salinäs, Kirsten Rassmus-Gröhn, and Calle Sjöström, "Supporting presence in collaborative environments by haptic force feedback", ACM Transactions on Computer-Human Interaction (TOCHI), vol. 7, Issue 4, Dec. 2000, pp. 461-476.*

Scharver, C.; Evenhouse, R.; Johnson, A.; Leigh, J.; , "Pre-surgical cranial implant design using the PARIS™ prototype," Virtual Reality, 2004. Proceedings. IEEE , vol., No., pp. 199-291, Mar. 27-31, 2004.*

Wei Ji; Williams, R.L.; Howell, J.N.; Conatser, R.R., Jr.; , "3D Stereo Viewing Evaluation for the Virtual Haptic Back Project," 2006 14th Symposium on Haptic Interfaces for Virtual Environment and Teleoperator Systems, pp. 251-258, Mar. 25-26, 2006.*

F. Boux de Casson, C. Laugier, "Modelling the dynamics of a human liver for a minimally invasive surgery simulator", C. Taylor, LA. Colchester (Eds.), Proceedings of the Medical Image Computing and Computer-Assisted Intervention (MICCAI '99), Lecture Notes in Computer Science, vol. 1679, Springer, Berlin, 1999, pp. 1166-1174.*

S. Miyazaki, J. Hasegawa, T. Yasuda and S. Yokoi, "A Deformable Object Model for Virtual Manipulation Based on Maintaining Local Shapes," Proceedings of World Multi-Conference on Systemics, Cybernetics and Informatics, SCI2001, Orlando, vol. 6, Jul. 22-25, 2001, pp. 100-105.*

Millman et al., "A System for the Implementation and Kinesthetic Display of Virtual Environments," SPIE Conference 1833: Telemanipulator Technology. Boston. pp. 49-57, 1992.*

Lenoir, J.; Fonteneau, S.; , "Mixing deformable and rigid-body mechanics simulation," Computer Graphics International, 2004. Proceedings , vol., No., pp. 327-334, Jun. 19-19, 2004.*

Jansson, J.; Vergeest, J.S.M.; Kuczogi, G.; Horvath, I.; , "Merging deformable and rigid body mechanics simulation," Computer Animation, 2001. The Fourteenth Conference on Computer Animation. Proceedings , vol., No., pp. 147-156, 2001.*

Jansson et al., "Combining deformable and rigid body mechanics simulation," The Vis. Comput. J. (2003).*

Finite Element Modeling in Surgery Simulation, Morten Bro-Nielsen, Proceedings of the IEEE, Mar. 1998.

Simulating Facial Surgery Using Finite Element Models, R.M. Koch et al., Computer Graphics Proceedings, 1996, XP-002460060.

Toward Realistic Soft-Tissue Modeling in Medical Simulation, Nerve Delingette, Proceedings of the IEEE, Mar. 1998, XP-002172862.

Partial PCT Search Report PCT/US2007/008,554.

Virtual Reality Vitrectomy Simulator, Paul F. Neumann, Lewis L. Sadler and Jon Gieser, Proceedings of the First International Conference on Medical Image Computing and Computer-Assisted Intervention, 1998, vol. 1496, pp. 910-917.

Virtual Reality Vitrectomy Simulator, Paul F. Neumann, Lewis L. Sadler and Jon Gieser, PhD Thesis University of Illinois, Chicago, Jun. 2000, 96 pp.

Physically Based Models with Rigid and Deformable Components, Demetri Terzopoulos and Andrew Witkin, IEEE Computer Graphics & Applications, Nov. 1988, pp. 41-51.

* cited by examiner

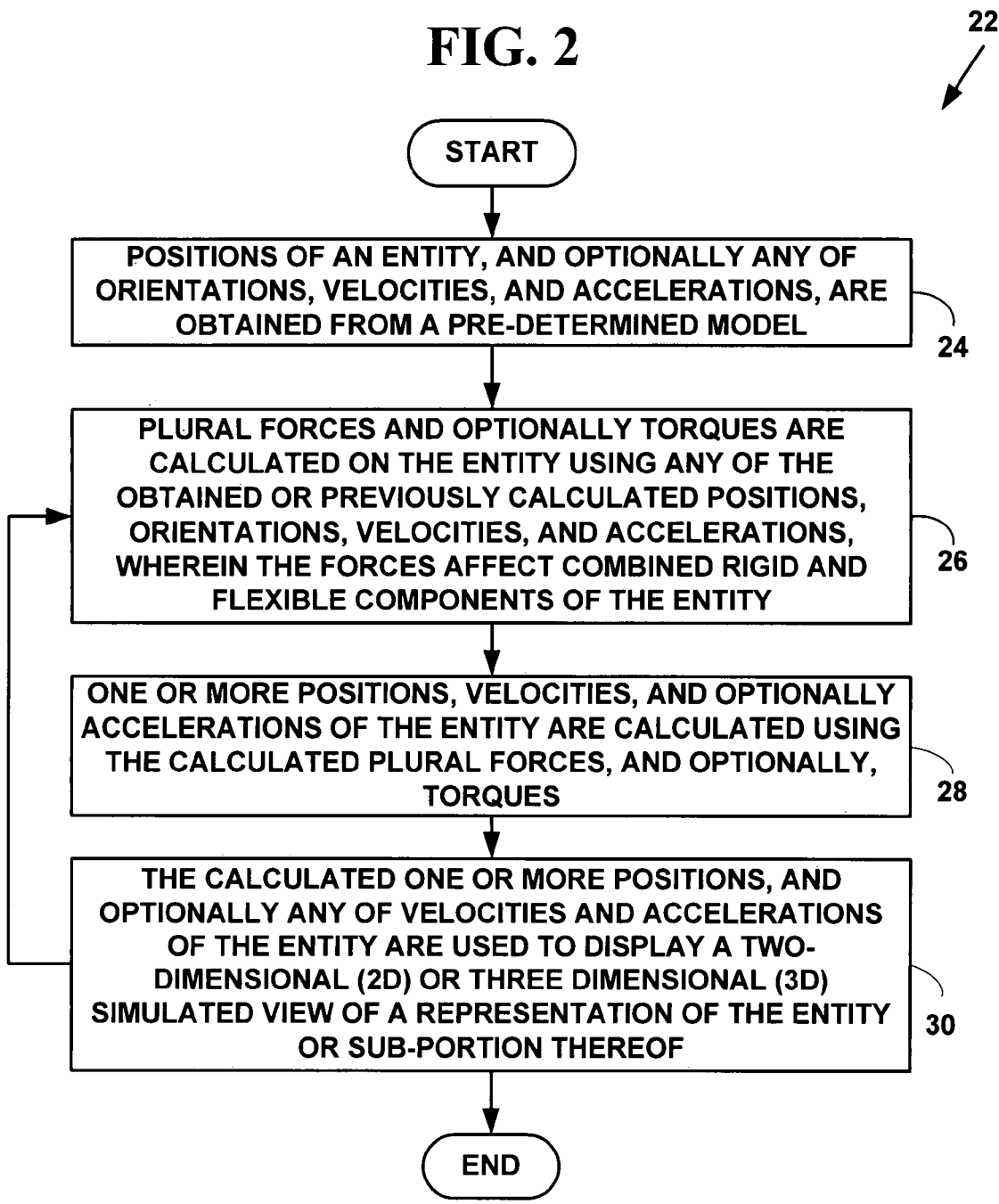

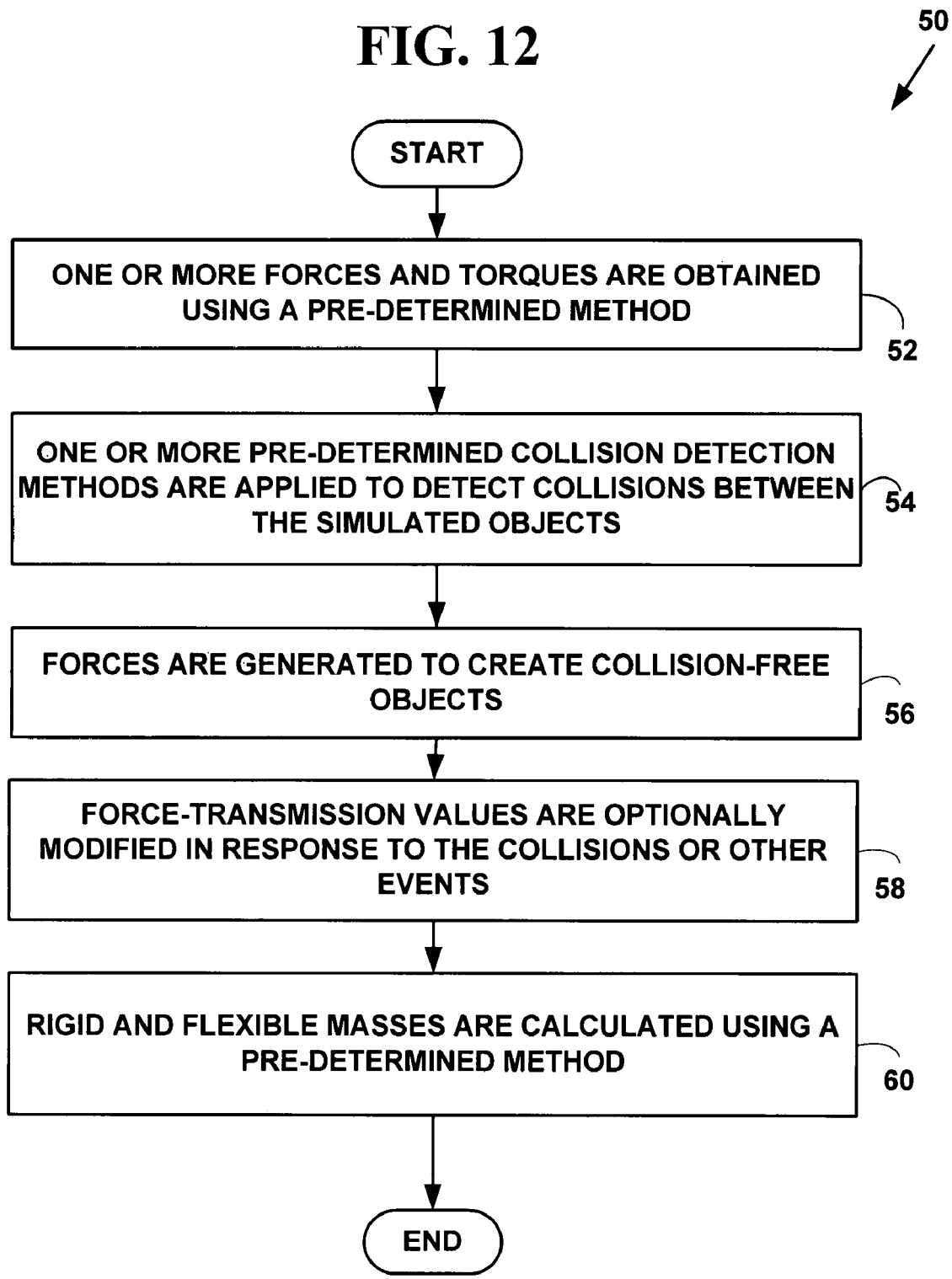

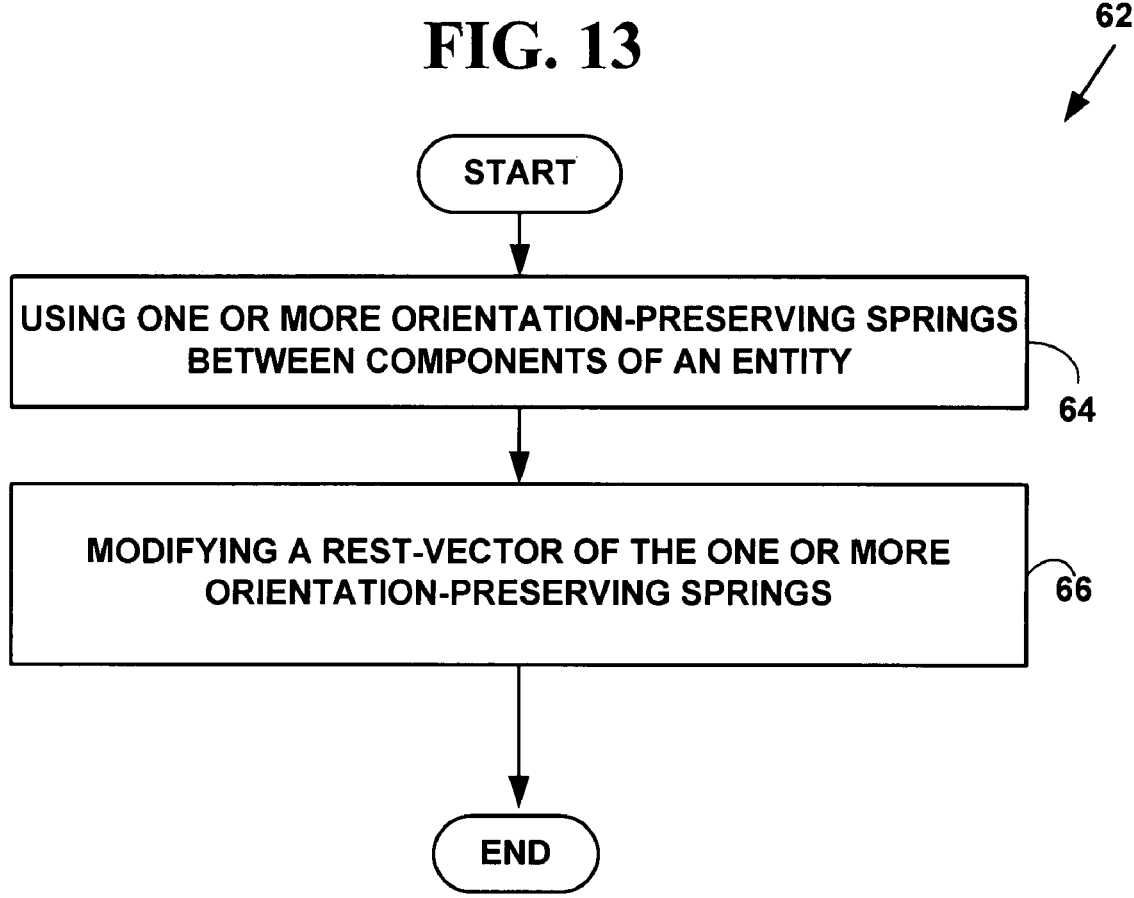

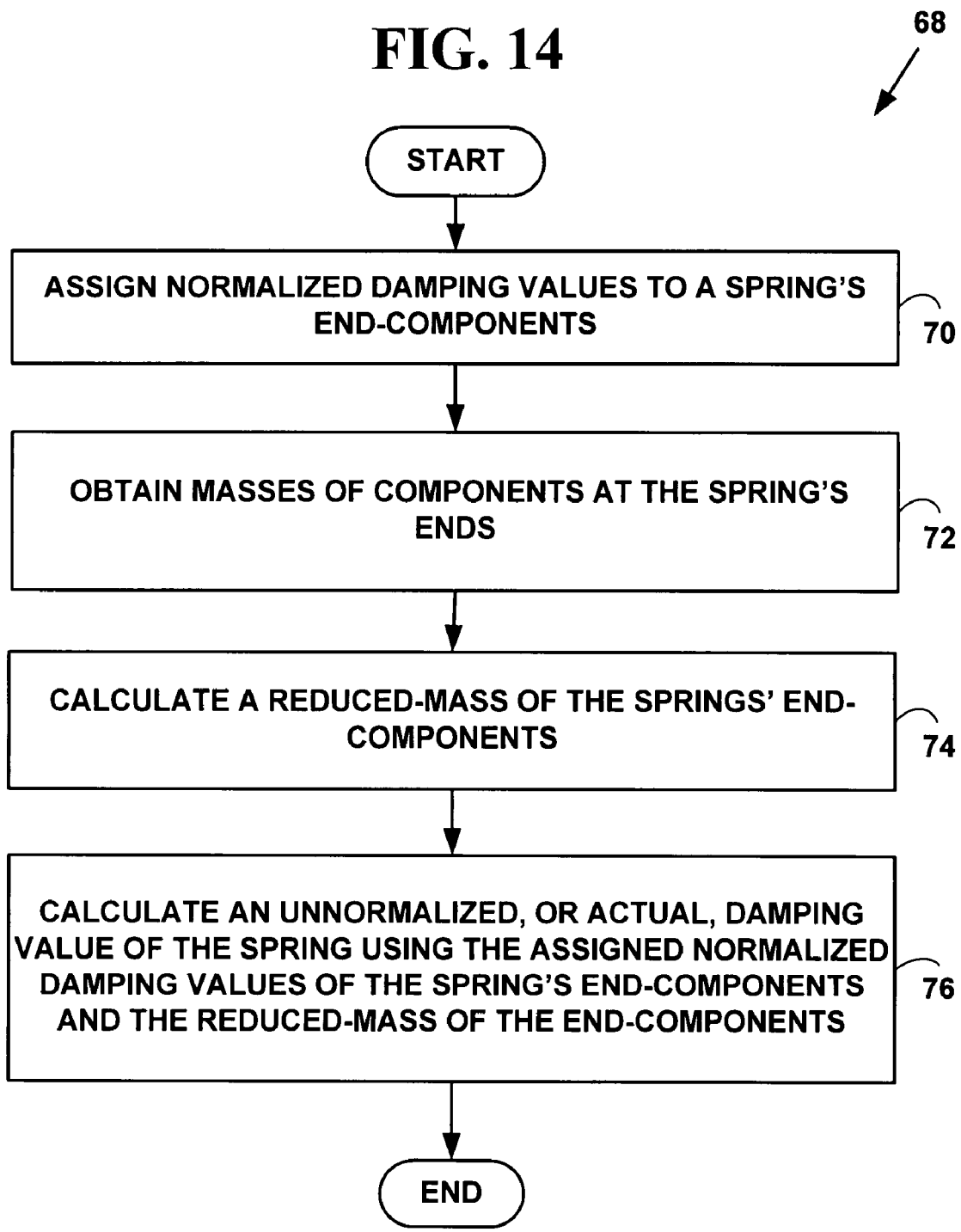

METHOD AND SYSTEM FOR INTERACTIVE SIMULATION OF MATERIALS

CROSS REFERENCES TO RELATED APPLICATIONS

This application claims priority from U.S. Provisional Patent Application 60/790,093, filed Apr. 8, 2006, the contents of which are incorporated by reference.

FIELD OF THE INVENTION

This invention relates to computer simulations. More specifically, it relates to a method and system for simulation of materials with combined rigid and flexible components, and a method of aligning hardware components for interacting with virtual objects.

BACKGROUND OF THE INVENTION

Simulation has many applications. It is used to design and prototype products. It is used to engineer and test materials and designs. It is used for training and education. It is used to create content for various forms of entertainment, animation, and virtual reality. It is also used in medicine; medical simulators include those used for making diagnostics of diseases and medical conditions, and for simulating surgery and surgical techniques. It is used in robotics. And simulation is used for many other purposes. Simulation affords users the benefits of experience without the risk.

Simulation can also be used to more effectively train users by increasing the number and variety of situations with which they come into contact. Simulation also allows research and exploration in new and meaningful ways. Users can repeat a given process many times to determine a best approach, each time trying a different method.

The practice of simulation is usually categorized by methodology. The most popular methods are rigid-body simulation, flexible-body simulation, and finite element analysis.

Rigid-body simulation is the practice of simulating an object using a group of point-masses, each point-mass having an unchanging distance from the other point-masses in the group. The entire group can be represented by a single position—the position of the group's center-of-mass—and a single orientation. Rigid bodies can be connected to each other by constraints or forces. The motion of a rigid body is described by changes in its center-of-mass position and its orientation.

Flexible-body simulation (or spring and dashpot simulation) is the practice of simulating an object using individual point-masses connected by idealized springs. Each spring has associated parameters, and applies equal-and-opposite forces to the masses at each of its ends. The spring attempts to maintain a specified distance between its masses. The motion of a flexible body is described by changes in the positions of each of the body's point-masses.

Finite element analysis (or FEA) is the practice of simulating an object using similarly shaped elements. A finite element model (or FEM) is composed of volumetric elements, such as tetrahedra, each having associated parameters and equations of motion. A group of elements and their parameters are used to describe a system of equations to be solved. The motion of a finite element model is described by the deformations of its elements.

In an interactive simulation, object positions are computed and displayed many times per second to give the appearance of motion. The term frame-rate is defined as the number of times per second the objects are displayed.

A limitation of rigid-body simulations is that they do not allow the simulation of soft objects. They are restricted to rigid objects and rigid or flexible links between these objects.

A limitation of flexible-body simulations is that they have difficulty simulating rigid or semi-rigid objects. As springs are made stiffer, instabilities arise, and their equations become increasingly difficult to solve at interactive frame-rates.

Another limitation of flexible-body simulations is that they simulate rotations by propagating translations across a network of springs. This makes the rotation of a body dependent upon the spring network and the number of steps used to advance the simulation in time. The fewer the number of springs, and the more steps used, the faster the apparent rotation occurs.

A limitation of FEA simulations is that they do not allow interaction with simulated objects, due to the time required for computation. Allowing interaction with simulated objects is desirable in that it provides modalities for approaching tasks in the industries that use simulators, and might allow simulators to be used in new industries.

Another limitation of FEA is the requirement that FEM objects be composed of homogeneously-shaped elements, which makes their creation more difficult, error-prone, and in certain situations, impossible. A more desirable method is an unstructured approach, whereby objects may be made any shape, dimension, or topology.

There are newer simulation technologies which allow for interaction with soft objects. One limitation of some of these technologies is the necessity to precompute certain aspects of the model's response to forces, or to make certain variables unchangeable. This makes it difficult to generate objects, or to change the characteristics of existing objects, while the simulation is running.

Another limitation of certain newer interactive soft-body simulation technologies is their inability to simulate materials that respond to forces in a nonlinear manner. Each object must be made of material or elements whose force-response is linear in nature.

Another limitation of certain newer interactive soft-body simulation technologies is the necessity that objects or elements be composed of homogeneous materials. This does not allow objects composed of heterogeneous materials to be simulated efficiently.

Another limitation of some soft-body technologies is the necessity that objects be made up of incompressible elements, which limits the kinds of materials that can be simulated.

Yet another limitation of some soft-body simulation technologies is an inability to simulate materials that are not in equilibrium. This precludes simulating objects with active, dynamic properties, such as those that change shape when stimulated by an electrical current.

There are a number of other problems specifically associated with interactive material simulations. Research has typically been done in the component areas of collision detection, collision response, rigid-body simulation, and flexible-body simulation. Barriers to a general-purpose interactive material simulation have historically included:

The amount of data to be computed in order to achieve a reasonable simulation

The complexity and number of calculations necessary

Lack of appropriate numerical methods to bring to bear on the simulation

Lack of methods to calculate real-time collisions between irregular moving surfaces Lack of expertise in the calculation of forces between colliding flexible bodies The inability to derive solutions to the motions of complicated dynamic models at interactive rates.

There have been attempts to solve some of these problems. For example, U.S. Pat. No. 7,050,955, entitled "System, method and data structure for simulated interaction with graphical objects," that issued to Carmel et al., teaches "Object simulation and interaction of and between computer-generated or graphical objects in a virtual space includes neutral scene graphs, data structures and procedures for using such graphs and data structures."

U.S. Pat. No. 6,714,901, entitled "Electronic device for processing image-data, for simulating the behaviour of a deformable object," that issued to Cotin et al. teaches "An electronic device for processing image data, particularly image data pertaining to medical procedures, includes a user interface with force feedback (4) corresponding to tool reactions, a "collision" module (18) for estimating a point of intersection between a straight line embodying a displacement derived from the action of the tool and a surface mesh of a given object, and an internal forces module (16) which estimates internal forces exerted on nodes of a first part of at least a volume mesh of the object, on the basis of a displacement applied on nodes pertaining to the surface mesh containing a point of intersection, of boundary conditions, and of node tensors and link tensors, from matrices of rigidity, and a reaction module (20) for determining the reaction force of the object corresponding to its deformation estimated on the basis of the internal forces, such that the force generated by the user interface (4) is balanced by reaction force."

U.S. Pat. No. 6,560,658, entitled "Data storage device with quick and quiet modes," that issued to Singer et al. teaches "Techniques are provided herein for reducing vibrations in various modes of a dynamic system. One such technique comprises incorporating vibration limiting and sensitivity constraints into a partial fraction expansion equation model of the system so as to reduce vibrations to specific levels. Another technique comprises shaping a command determined using the partial fraction expansion equation model to produce a desired output. The entire command may be shaped or only selected portions thereof which produce vibrations. Another technique involves commanding in current to produce saturation in voltage. By doing this, it is possible to command voltage switches. The times at which the switches occur can be set to reduce system vibrations. Other techniques are also provided. These include varying transient portions at the beginning, middle and/or end of a move and using Posicast inputs, among others."

U.S. Pat. No. 6,486,872, entitled "Method and apparatus for providing passive fluid force feedback," that issued to Rosenberg teaches "A method and apparatus for interfacing the motion of an object with a digital processing system includes a sensor for detecting movement of the object along a degree of freedom. A passive pneumatic or hydraulic damper is coupled to the object to provide a damping resistance to the object along the degree of freedom and resist a movement of the object. The damping resistance is provided by regulating the control of a fluid with a digital computing apparatus, thus providing a low-cost, low-power force-feedback interface that is safe for the user. The damper and sensor provide an electromechanical interface between the object and the electrical system. A gimbal or other interface mechanism can be coupled between the damper and the object. The interface is well suited for simulations or video games in which an object such as a joystick is moved and manipulated by the user."

U.S. Pat. No. 6,314,473, entitled "System for removing selected unwanted frequencies in accordance with altered settings in a user interface of a data storage device," that issued to Singer et al., teaches "Techniques are provided herein for reducing vibrations in various modes of a dynamic system. One such technique comprises incorporating vibration limiting and sensitivity constraints into a partial fraction expansion equation model of the system so as to reduce vibrations to specific levels. Another technique comprises shaping a command determined using the partial fraction expansion equation model to produce a desired output. The entire command may be shaped or only selected portions thereof which produce vibrations. Another technique involves commanding in current to produce saturation in voltage. By doing this, it is possible to command voltage switches. The times at which the switches occur can be set to reduce system vibrations. Other techniques are also provided. These include varying transient portions at the beginning, middle and/or end of a move and using Posicast inputs, among others."

U.S. Pat. No. 6,300,937, entitled "Method and apparatus for controlling force feedback for a computer interface device," that issued to Rosenberg teaches "A method and apparatus for controlling and providing force feedback using an interface device manipulated by a user. A microprocessor is provided local to the interface device and reads sensor data from sensors that describes the position and/or other information about an object grasped and moved by the user, such as a joystick. The microprocessor provides the sensor data to a host computer that is coupled to the interface device by a communication bus that preferably includes a serial interface. In a "host-controlled" embodiment, the host computer calculates force values using the sensor data and other parameters of a host application program and sends the force values to the local microprocessor, which directly provides the force values to actuators to apply forces to the user object. In a "reflex" embodiment, the host computer sends high level supervisory commands to the local microprocessor, and the microprocessor independently implements a local process based on the high level command for reading sensor data and providing force values to the actuators using sensor data and other parameters."

U.S. Pat. No. 6,211,848, entitled "Dynamic holographic video with haptic interaction," that issued to Plesniak et al., teaches "A user is able to interact with and modify an electronic holographic image using a force-feedback (or haptic) device, which is capable of sensing and reporting the 3D position of its hand-held stylus and "displaying" appropriate forces to the user. Thus, a user can feel and modify specified shapes in the haptic workspace. The haptic workspace is precisely registered with the free-standing, spatial image displayed by a holographic video (holovideo) system. In the coincident visuo-haptic workspace, a user can see, feel, and interact with synthetic objects that exhibit many of the properties one expects of real ones, and the spatial display enables synthetic objects to become a part of the user's manipulatory space."

U.S. Pat. No. 6,113,395, entitled "Selectable instruments with homing devices for haptic virtual reality medical simulation," that issued to Hon teaches "Invention is apparatus for using selectable instruments in virtual medical simulations with input devices actuated by user and resembling medical instruments which transmit various identifying data to the virtual computer model from said instruments which have been selected; then, said apparatus assist in creating full immersion for the user in the virtual reality model by tracking and homing to instruments with haptic, or force feedback generating, receptacles with which said instruments dock by means of a numerical grid, creating a seamless interface of instrument selection and use in the virtual reality anatomy."

U.S. Pat. No. 5,882,206, entitled "Virtual surgery system," that issued to Gillio teaches "A virtual surgery system or virtual testing system provides a simulation or test based on image data. A simulator combined with a real exam requires simulation tasks by a test taker. Additionally, a surgical procedure may be simulated using image data of a patient in devices simulating the physical instruments a surgeon uses in performing the actual procedure, for example. The user input device, such as a mouse, three dimensional mouse, joystick, seven dimensional joystick, full size simulator, etc., can be used in a virtual simulation to move through the image data while the user looks at the data and interaction of the input device with the image data on a display screen. Force feedback can be provided based on physical constraint models (of the anatomy, for example), or based on edge and collision detection between the virtual scope or virtual tool used by the operator and walls or edges of the image data in the image space. The virtual simulator may be used as a teaching, training, testing, demonstration, or remote telesurgery device, for example.

U.S. Pat. No. 5,704,791, entitled "Virtual surgery system instrument," that issued to Gillio teaches "A virtual surgery system or virtual testing system provides a simulation or test based on image data. A simulator combined with a real exam requires simulation tasks by a test taker. Additionally, a surgical procedure may be simulated using image data of a patient in devices simulating the physical instruments a surgeon uses in performing the actual procedure, for example. The user input device, such as a mouse, three dimensional mouse, joystick, seven dimensional joystick, full size simulator, etc., can be used in a virtual simulation to move through the image data while the user looks at the data and interaction of the input device with the image data on a display screen. Force feedback can be provided based on physical constraint models (of the anatomy, for example), or based on edge and collision detection between the virtual scope or virtual tool used by the operator and walls or edges of the image data in the image space. The virtual simulator may be used as a teaching, training, testing, demonstration, or remote telesurgery device, for example."

U.S. Pat. No. 5,739,811, entitled "Method and apparatus for controlling human-computer interface systems providing force feedback," that issued to Rosenberg teaches "A method and apparatus for controlling and providing force feedback using an interface device manipulated by a user. A microprocessor is provided local to the interface device and reads sensor data from sensors that describes the position and/or other information about an object grasped and moved by the user, such as a joystick. The microprocessor provides the sensor data to a host computer that is coupled to the interface device by a communication bus that preferably includes a serial interface. In a "host-controlled" embodiment, the host computer calculates force values using the sensor data and other parameters of a host application program and sends the force values to the local microprocessor, which directly provides the force values to actuators to apply forces to the user object. In a "reflex" embodiment, the host computer sends high level supervisory commands to the local microprocessor, and the microprocessor independently implements a local process based on the high level command for reading sensor data and providing force values to the actuators using sensor data and other parameters."

U.S. Published Patent Application No. 2005/0046629, entitled "Animation method of deformable objects using an oriented material point and generalized spring model," that was published by Jeong et al. teaches "Disclosed is an animation method of deformable objects using an oriented material point and generalized spring model. The animation method comprises the following steps of: modeling a structure of a deformable object into oriented material points and generalized springs; initializing forces and torques acting on the material points, calculating the forces acting on the material points owing to collision of the material points and gravity, calculating the spring forces and torques acting on the material points, obtaining new positions and postures of the material points; updating positions, velocities, postures and angular velocities of the material points based upon physics, and displaying and storing updated results. The oriented material point and generalized spring model of the invention contains the principle of the conventional mass-spring model, but can animate deformable objects or express their structures in more intuitive manner over the conventional mass-spring model. Also, the material point and generalized spring model of the invention can express elongate deformable objects such as hair and wrinkled cloth, which cannot be expressed in the prior art, so as to animate features of various objects."

U.S. Published Patent Application No. 2003/0088389, entitled "Long elements method for simulation of deformable objects," that was published by Balaniuk et al. teaches "Long Elements Method (LEM) for real time physically based dynamic simulation of deformable objects. The LEM is based on a new meshing strategy using long elements whose forms can be straight or arbitrary. The LEM implements a static solution for elastic global deformations of objects filled with fluid based on the Pascal's principle and volume conservation. The volumes are discretised in long elements, defining meshes one order of magnitude smaller than meshes based on tetrahedral or cubic elements. The LEM further combines static and dynamic approaches to simulate the same deformable medium, allowing modeling a three-dimensional internal state at any point inside the deforming medium from a reduced number of explicitly updated elements. Complex elastic and plastic deformations can be simulated in real time with less computational effort. The LEM is particularly useful in real time virtual interactions, soft tissue modeling, and graphic and haptic rendering."

U.S. Published Patent Application No. 2002/0180739, entitled "Method and apparatus for simulating soft object movement" that was published by Reynolds et al. teaches "Movement of a soft body is simulated by defining its surface as an arbitrary mesh of points connected by edges. Each point is represented as a point mass, subject to conventional laws of motion. The simulator represents forces acting on the point masses, namely skin forces connecting pairs of point masses and volumetric forces for maintaining relative positions with no net linear or rotational forces on the soft body."

In a paper entitled "Virtual Reality Vitrectomy Simulator," published by Paul F. Neumann, Lewis L. Sadler, and Jon Gieser M.D. in the Proceedings of the First International Conference on Medical Image Computing and Computer-Assisted Intervention, 1998, pp. 910-917 teaches "In this study, a virtual reality vitrectomy simulator is being developed to assist Ophthalmology residents in correcting retinal detachments. To simulate this type of surgery, a three dimensional computer eye model was constructed and coupled with a mass-spring system for elastic deformations. Five surgical instruments are simulated including: a pick, blade, suction cutter, laser, and drainage needle. The simulator will be evaluated by a group of fellows and retinal surgeons with a subjective Cooper-Harper survey commonly used for flight simulators."

In an IEEE paper entitled "Deformable models: physical based models with rigid and deformable components," published by Demetri Terzopoulous and Andrew Witkin, in *IEEE Computer Graphics and Applications*, November 1988, pp. 41-51 teaches "This article develops an alternative formulation of deformable models. We decompose deformations into a reference component, which may represent an arbitrary shape, and a displacement component allowing deformation away from this reference shape. The reference component evolves according to the laws of rigid-body dynamics. Equations of nonrigid motion based on linear elasticity govern the dynamics of the displacement component. With nonrigid and rigid dynamics operating in unison, this hybrid formulation yields well-conditioned discrete equations, even for complicated reference shapes, particularly as the rigidity of models is increased beyond the stability limits of our prior formulation. We illustrate the application of or deformable models to a physically based computer animation project."

Thus, it is desirable to have a general-purpose interactive material simulation that solves most or all of the problems discussed above.

SUMMARY OF THE INVENTION

In accordance with preferred embodiments of the present invention, some of the problems associated with simulating materials are overcome. A method and system for simulation, display, and interaction with materials is provided.

The method and system provide improved flexible simulation, the ability to combine rigid and flexible simulation, a collision-detection method for simulating materials, and a hardware and software configuration which allows a user to interact directly with simulated objects with combined rigid and flexible components.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a flow diagram illustrating a method for simulating rigid, semi-rigid, and flexible components of materials;

FIG. 12 is a flow diagram illustrating a method for simulating collisions between an entity or entities;

FIG. 13 is a flow diagram illustrating a method for use of orientation-preserving springs for creating a permanent or semi-permanent shape change in a material or body; and FIG. 14 is a flow diagram illustrating a method for normalizing a damping value of a spring.

DETAILED DESCRIPTION OF THE INVENTION

Figure 1A:
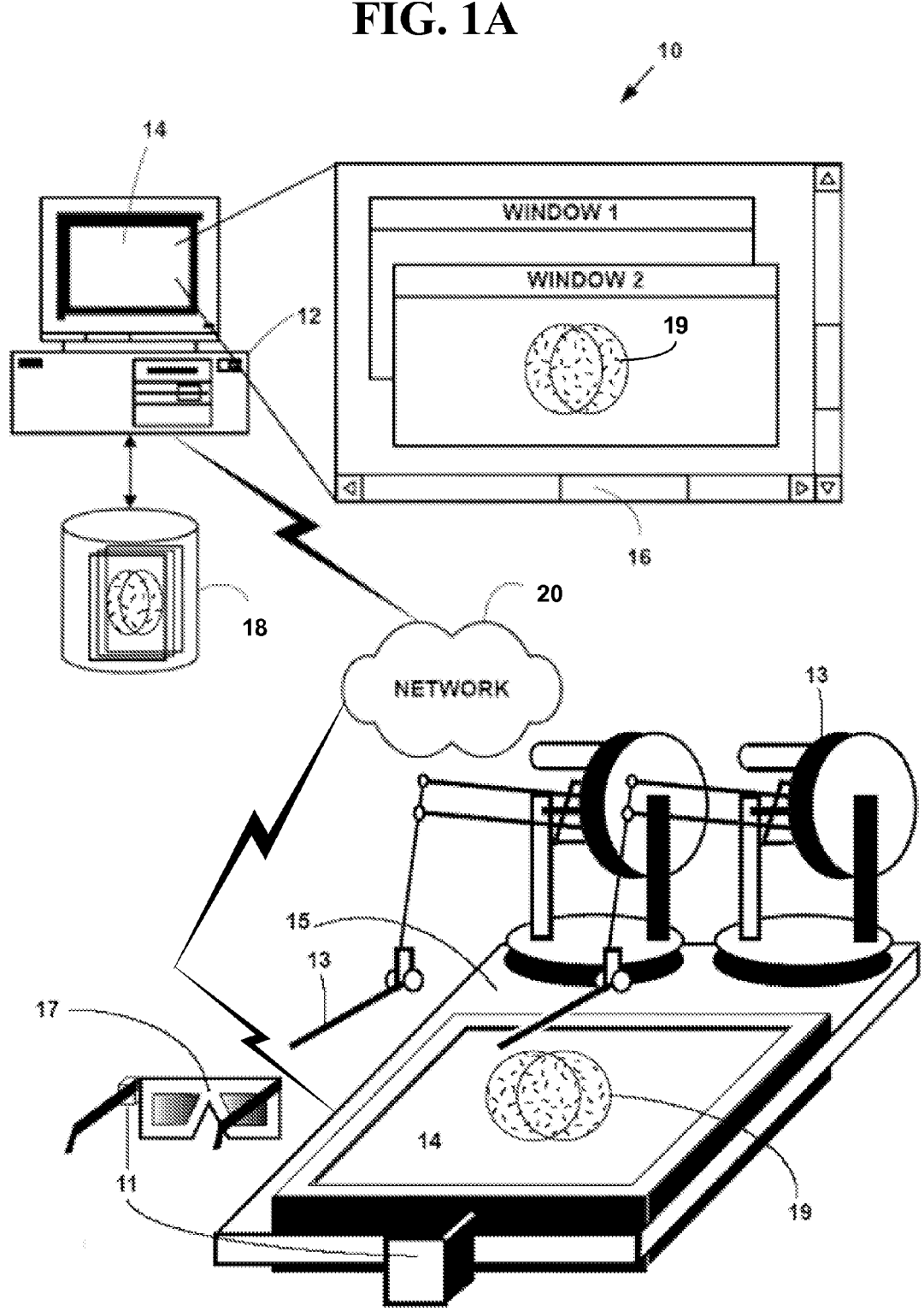
FIG. 1A is a block diagram of an exemplary simulation system.

FIG. 1A is a block diagram illustrating an exemplary simulation system 10. The exemplary system 10 includes one or more computers 12 with one or more processors or central processing units (CPUs) with one or more computer displays 14 (two of which are illustrated). The computer display 14 may include any of a windowed graphical user interface ("GUI") 16 with multiple windows, or one or more simulation views 19, to a user. One or more databases 18 (one of which is illustrated) include data in various digital data formats. The databases 18 may be integral to a memory system on the computer 12 or in secondary storage such as a hard disk, floppy disk, optical disk, or other non-volatile mass storage devices. The computer 12 and the databases 18 may be in communications with and accessible via one or more communications networks 20.

In one embodiment, exemplary simulation system 10 includes additional components. Tracking devices 11 may be connected to the one or more computers 12. Stereoscopic glasses 17 and tracked devices 11 may be worn by a user. Position-tracking devices 13 (e.g. haptic devices etc.) are connected to one or more computers 12. (Position-tracking and haptics may be embodied in the same device, or a position-tracking device can be used in place of a haptice device.) As is known in the simulation arts, a haptic device 13 allows a user to interact with a computer 12 by receiving tactile feedback. The haptic devices 13, computer display 14, and tracking devices 11 are physically connected and fixed at specific distances and orientations with respect to each other using a rigid harness 15.

The one or more computers 12 may be replaced with client terminals in communications with one or more servers, or with personal digital/data assistants (PDA), laptop computers, mobile computers, Internet appliances, one or two-way pagers, mobile phones, or other similar desktop, mobile or hand-held electronic devices.

The tracking and tracked devices 11 and haptic or position-sensing devices 13 may be connected to one or more computers 12 via USB or its variants, IEEE 1394/FireWire, serial, parallel, PCI, PCI-express or other card, or other wired or wireless methods of connectivity.

The tracking and tracked devices 11 and haptic or position-sensing devices 13 may operate using wired or wireless electrical, mechanical, electromechanical, magnetic, solid-state or other technologies not limited to magnets, magnetic fields, lenses and other optics, light-emitting diodes, filters, visible-spectrum and infrared light, lasers, motors, gears, sensors, encoders, and transducers, combined with other methods not limited to analog-to-digital converters, data-transmission protocols and operating-system and application software layers.

Stereoscopic glasses 17 may operate using linear or circular polarization filters, colored lenses, LCD shutters, or other means. Glasses may also be absent from the system entirely. In this case, stereoscopy can still be achieved if the computer display 14 uses an autostereoscopic technology, such as barrier-strips.

Figure 1B:
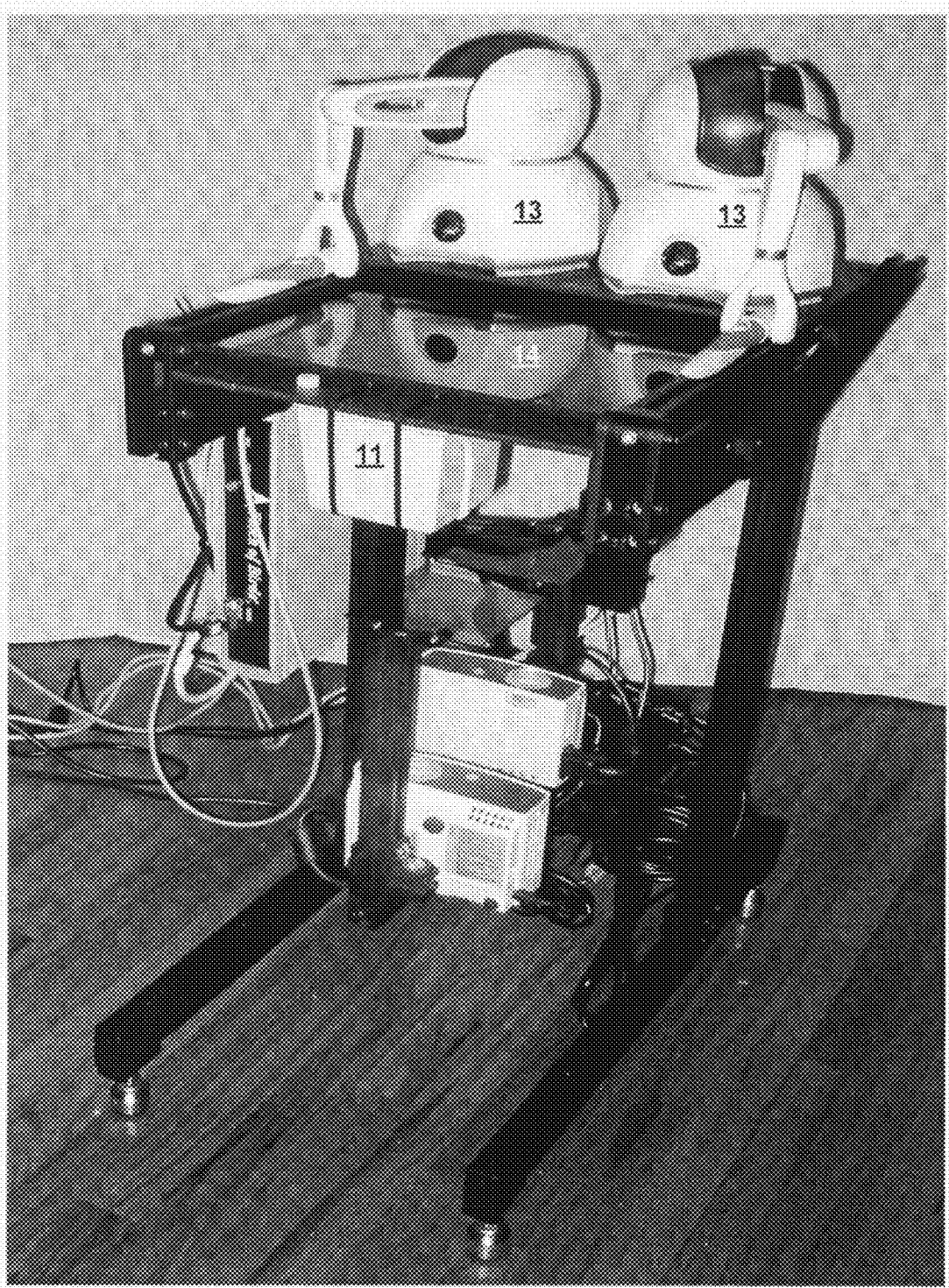
FIG. 1B is a digital photograph illustrating a portion of an actual exemplary simulation system.

FIG. 1B is a block diagram illustrating a digital photograph 21 of a portion of an actual exemplary simulation system 10. This digital photograph 21 does not illustrate one or more computers 12.

The zero or more communications networks 20 may include, but are not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 20.

The communications networks 20 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications networks 20 may include one or more servers and one or more web-sites accessible by users to send and receive information useable by the one or more computers 12. The one or more servers, may also include one or more associated databases for storing electronic information.

Preferred embodiments of the present invention devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.adsl.com."

The communications networks 20 may include a layered architecture. As is known in the art, the Open Systems Interconnection (OSI) reference model is one layered architecture that standardizes levels of service and types of interaction for computers exchanging information through a communications network. The OSI reference model separates network device-to-network device communications into seven protocol layers, or levels, each building-and relying-upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

The layered architecture may also include an Internet layered architecture comprising a physical layer, a data-link layer, a network layer comprising the Internet Protocol (IP) transport layer comprising the Transmission Control Protocol (TCP) or User Datagram Protocol (UDP), and an application layer. However, the present invention is not limited to this embodiment and architectures can also be used to practice the invention.

The communications networks 20 may include, but is not limited to, data networks using the Transmission Control Protocol (TCP), User Datagram Protocol (UDP), Internet Protocol (IP) and other data protocols. The communications network 20 may also include a public or private bus (e.g., USB, etc.) or be connected directly via wired or wireless connections.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 20 and the present invention is not limited to TCP/UDP/IP.

An operating environment for devices and interfaces of the present invention include a processing system with one or more high speed Central Processing Unit(s) (CPU), zero or more high speed Graphical Processing Unit(s) (GPU), zero or more high speed audio processing unit(s) (APU), or other processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed", "GPU executed", "APU executed", or "processor executed."

It will be appreciated that acts and symbolically represented operations or instructions include the manipulation of electrical signals by the CPU, GPU, APU, or other processor (s). An electrical system represents data bits which cause a resulting transformation or reduction of the electrical signals, and the maintenance of data bits at memory locations in a memory system to thereby reconfigure or otherwise alter the processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM)) mass storage system readable by the CPU, GPU, APU, or other processor(s). The computer readable medium includes cooperating or interconnected computer readable medium, which exist exclusively on the processing system or be distributed among multiple interconnected processing systems that may be local or remote to the processing system.

In one embodiment of the invention, the communications networks 20 include wireless and wired interfaces. The wired and wireless interfaces may include security features.

The wired interfaces include wired interfaces and corresponding networking protocols for wired connections to the Public Switched Telephone Network (PSTN) or a cable television network (CATV) including HDTV that connect the network devices 12 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," Bluetooth or other types of wireless interfaces. However, the present invention is not limited to such wireless interface and other types of wireless interfaces can also be used.

In another embodiment of the present invention, the wireless network device 12 includes a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

Security and Encryption

Devices and interfaces of the present invention may include security and encryption for secure communications and secure recording, transmission and display of medical information. Privacy is required for certain types of medical information collected, stored and displayed for medical patients. For example, in association with the Health Insurance Portability and Accountability Act of 1996 (HIPAA), the U.S. Department of Health and Human Services (HHS) issued the regulations Standards for Privacy of Individually Identifiable Health Information . For most covered entities, compliance with these regulations, known as the "Privacy Rule," was required as of Apr. 14, 2003. The security and encryption described herein is used to protect such privacy and other types of medical patient privacy.

Devices and interfaces of the present invention may include security and encryption for secure communications. Wireless Encryption Protocol (WEP) (also called "Wired Equivalent Privacy") is a security protocol for WiLANs defined in the IEEE 802.11b standard. WEP is cryptographic privacy method, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One other problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption method as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption methods between wireless access points and wireless devices. The authentication schemes proposed in the draft standard include Extensible Authentication Protocol (EAP). One proposed encryption method is an Advanced Encryption Standard (AES) encryption method.

Dynamic negotiation of authentication and encryption methods lets RSN evolve with the state of the art in security, adding methods to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher method. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption method that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption methods.

Secure Hash Method (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Method (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 method is intended for digital signature applications, where a large file must be "compressed" in a secure manner before being encrypted with a private (secret) key under a public-key cryptosystem such as RSA. The IETF RFC-1321, entitled "The MD5 Message-Digest Method" is incorporated herein by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC) is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated herein by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated herein by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E.B. Hickman, 1995 is incorporated herein by reference. More information on SSL is available at the URL "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

Material Simulation Method

FIG. 2 is a flow diagram illustrating a method for simulating rigid, semi-rigid, and flexible components of materials. At Step 24, positions of an entity, and optionally any of orientations, velocities, and accelerations, are obtained from a predetermined model. At Step 26, plural forces and optionally torques are calculated on the entity using any of the obtained or previously calculated positions, orientations, velocities, and accelerations. The plural forces and torques may be calculated from the combined effects of any of gravity, friction, interaction with other entities, interactions within a single entity, collision with other entities, interaction with objects controlled by a user holding, wearing, or manipulating a haptic or other device, or other forces, these forces affecting the combined rigid and flexible components of the entity. At Step 28, one or more positions, velocities, and optionally accelerations of the entity are calculated using the previously calculated plural forces, and optionally, torques. At Step 30, the calculated one or more positions, and optionally any of velocities and accelerations of the entity are used to display a two-dimensional (2D) or three dimensional (3D) simulated view of a representation of the entity or sub-portion thereof. The 2D or 3D simulated view may include a view of the components of the entity. Steps 26-30 are repeated as many times as necessary.

Method 22 is illustrated with one exemplary embodiment. However, the present invention is not limited to such an embodiment and other embodiments can also be used to practice the invention.

In one exemplary embodiment, the following notation illustrated in Table 1 is used. However, the present invention is not limited to such an embodiment and other embodiments can also be used to practice the invention.

TABLE 1

Notation
Vectors are in bold and scalars are in *italics*. Some scalars may also be vectors in other embodiments.

| | |
|---|---|
| $L$ | refers to a spring's current length |
| $L_0$ | refers to a spring's rest length |
| $c$ | refers to a spring's damping |
| $k$ | refers to a spring's stiffness |
| $m$ | refers to a component's mass |
| $m_i$ | is the mass of the body's $i^{th}$ component |
| $m_r$ | is the body's rigid mass |
| $n$ | is the number of components belonging to the body |
| $r$ | refers to a component's force-transmission value |
| $t$ | is the simulation time-step |
| $trans_i$ | is the force-transmission value of the body's $i^{th}$ component |
| $trans_r$ | is the body's force-transmission value |
| $\mu_s$ | is the coefficient of static friction |
| $\mu_k$ | is the coefficient of kinetic friction |
| G | is the gravity vector: $\{0, -9.8, 0\}$ |
| $\mathbf{I}^{-1}$ | is the inverse of the body's inertia tensor |
| L | is the body's vector angular momentum |
| L | in the context of an orientation-preserving spring, the spring's current orientation and length |
| $\mathbf{L}_0$ | an orientation-preserving spring's rest orientation and length |
| $\hat{\mathbf{L}}$ | refers to a spring's unitized current direction |
| $\mathbf{f}_i$ | is the vector force acting on the body's $i^{th}$ component |
| $\hat{\mathbf{f}}_x$ | is the unit-vector x-axis of the body's orthonormal basis reference frame |
| $\hat{\mathbf{f}}_y$ | is the unit-vector y-axis of the body's orthonormal basis reference frame |
| $\hat{\mathbf{f}}_z$ | is the unit-vector z-axis of the body's orthonormal basis reference frame |
| $\boldsymbol{\tau}$ | is the vector torque acting on the body |
| $\boldsymbol{\tau}_i$ | is the vector torque acting on the body's $i^{th}$ component |
| $\hat{\mathbf{v}}$ | is a unitized vector |
| $\boldsymbol{\omega}$ | is the body's vector angular velocity |
| $\dot{\boldsymbol{\omega}}$ | is the body's vector angular acceleration |
| $\boldsymbol{\omega}(t)$ | is the body's current vector angular velocity |
| $\boldsymbol{\omega}(t - \Delta t)$ | is the body's vector angular velocity at the previous time-step |
| $q(\hat{\boldsymbol{\omega}},|\boldsymbol{\omega}|)$ | is a unit quaternion representing rotation by the vector angular velocity |
| $\mathbf{x}_i$ | is the vector position of the body's $i^{th}$ component |
| $\mathbf{x}_r$ | is the vector position of the body's center of mass |
| $\mathbf{x}_i^{body}$ | is the vector position of the body's $i^{th}$ component relative to $\mathbf{x}_r$ |
| $\mathbf{x}_i^{ref}$ | is the vector position of the body's $i^{th}$ component in the body's $uvw$ space |
| $\mathbf{x}_i^{undeformed}$ | is the vector position of the undeformed body's $i^{th}$ component |
| $\mathbf{x}_r^{undeformed}$ | is the vector position of the undeformed body's center of mass |
| $\dot{\mathbf{x}}_i$ | is the vector velocity of the body's $i^{th}$ component without angular velocity |
| $\dot{\mathbf{x}}_r$ | is the vector velocity of the body's center of mass |
| $\dot{\mathbf{x}}_i^{body}$ | is the vector velocity of the body's $i^{th}$ component relative to $\dot{\mathbf{x}}_r$ |
| $\ddot{\mathbf{x}}_i^f$ | is the deformable vector acceleration of the body's $i^{th}$ component |
| $\ddot{\mathbf{x}}_i^r$ | is the rigid vector acceleration of the body's $i^{th}$ component without angular acceleration |
| $\dot{\mathbf{x}}_i^\omega$ | is the vector angular velocity of the body's $i^{th}$ component, converted to linear velocity |
| $\ddot{\mathbf{x}}_i^{centrifugal}$ | is the vector acceleration of the body's $i^{th}$ component due to centrifugal forces |
| $\ddot{\mathbf{x}}_i^{coriolis}$ | is the vector acceleration of the body's $i^{th}$ component due to coriolis forces |
| $q(\hat{\boldsymbol{\omega}},|\boldsymbol{\omega}|)$ | is a unit quaternion representing rotation by the vector angular velocity |
| $s_i^{index1}$ | is the body's $index1^{th}$ component connected to its $i^{th}$ orientation-preserving spring |
| $s_i^{index2}$ | is the body's $index2^{th}$ component connected to its $i^{th}$ orientation-preserving spring |

TABLE 1-continued

Notation
Vectors are in bold and scalars are in *italics*. Some scalars may also be vectors in other embodiments.

$s_i^{L0}$     is the vector rest-length of the body's $i^{th}$ orientation-preserving spring As is known in the art, a dashpot is a pneumatic device such as a piston assembly, or other similar device whose motion is dependent on the flow characteristics of a fluid to which a force has been applied. A spring is an elastic device that flexes when a force is applied to it and returns to its original shape when the force is released. Spring and dashpot models may be used herein to simulate materials.

In such an exemplary embodiment, at Step 24, an initial set of (x,y,z) positions and other characteristics of an entity to be simulated using a spring-and-dashpot model are obtained. In one embodiment the initial set of positions is obtained from a commercial modeling software package. However, the present invention is not limited to obtaining a set of initial (x,y,z) positions and other characteristics from a commercial modeling software package, and other methods can also be used to obtain the initial positions and characteristics of the entity, including, but not limited to, generation of the positions and characteristics using a programmatically-defined method, specification of the positions and characteristics using data gathered from a scanning device such as an MRI, CT, or laser scanner, specification of the positions and characteristics via user interaction, user inputs or a combination thereof of methods.

As is known in the simulation arts, a haptic interface is a device which allows a user to interact with a computer by receiving tactile feedback. This feedback is achieved by applying one or more degrees of force to a device held or worn by the user, at one or more points on the device, along any of the x, y, and z axes, and optionally one or more torques, each about an axis of rotation at a point on the device. There are two main types of haptic devices: devices that allow a user to "touch" and manipulate objects in three dimensions (3D), and devices that allow users to "feel" the textures of 2D objects. 3D haptic devices are more often used for surgical and other types of simulations, in robotic applications (e.g., remote operation in hazardous environments), and in videogames.

Velocities, optionally accelerations, and zero or more other quantities are calculated or obtained for each of the components. In one exemplary embodiment, Step 24 includes the steps illustrated in Table 2. However, the present invention is not limited to such an exemplary embodiment and more, fewer and other steps and other embodiments can also be used to practice the invention.

TABLE 2

1. Read a model's data, including vertex positions, polygons, and vertex colors, from a data file exported from a modeling software package.
2. Create a body composed of components whose positions are at the vertices of the model.
3. Use the unclamped vertex color values (Red, Green, Blue, and Alpha) to assign these properties to each of the components:
  a. Red value = mass
  b. Green value = spring stiffness (k)
  c. Blue value = spring damping (c)
  d. Alpha value = force-transmission
4. Create an internal orientation-preserving spring for each polygon-edge, unless the edge's end-vertices both have force-transmission values of 1; in this case, the vertices are rigidly coupled, and internal spring forces will have no effect, so no spring is created. Assign a stiffness value to each orientation-preserving spring as an average of the spring's two TABLE 2-continued end components' stiffnesses, $$\frac{k1 + k2}{2},$$

increased in proportion to the average force-transmission, $$\frac{r1 + r2}{2},$$

using the formula:

$$\frac{\frac{k1+k2}{2}}{1 - \frac{r1+r2}{2}}.$$

Next, assign the spring's damping. The damping value of each end component represents a critical-damping ratio, where 0 is undamped, 1 is critically-damped, and > 1 is overdamped. Average the two components' associated damping values, $$\frac{c1 + c2}{2}.$$

Calculate the critical damping value with respect to the components' reduced mass, $$\sqrt{4k \frac{m1 m2}{m1 + m2}},$$

and assign the spring's actual damping value using the formula:

$$\frac{c1 + c2}{2} \sqrt{4k \frac{m1 m2}{m1 + m2}}.$$

In an alternate embodiment, do a weighted average of the k, c, and r values using the sizes of the components' relative masses.
5. Calculate the body's center of mass.
6. Assign the body a default orthonormal basis reference frame using the world-coordinate x, y, and z axes.
7. Calculate each component's position in the default reference frame, or its uvw coordinates, by computing its position minus the center of mass's position.
8. Create velocities and optionally accelerations for each component by initializing them to zero, or by specifying them interactively, or manually, or a pre-determined automated method, or by another method.
9. Repeat steps 1-8 as many times as there are bodies.

At Step 26, plural forces and optionally torques are calculated on the entity using any of the obtained or calculated positions, orientations, velocities and accelerations. The plural forces may include forces from any of gravity, friction, interaction with other moving or nonmoving entities, interactions originating from within an entity, collisions with other entities, collisions within an entity, interaction with entities controlled by a user holding, wearing, or in any way manipulating a haptic or other device, or other forces. These forces affect the combined rigid and flexible components of the entity simultaneously.

In one exemplary embodiment, Step 26 includes one or more of the forces illustrated in Table 3. However, the present invention is not limited to such an exemplary embodiment and other embodiments can also be used to practice the invention.

TABLE 3

1. Add forces and torques:
   a. Gravity: $f_i = G\, m_i$ and $\tau_i = x_i^{body} \times f_i$.
   b. Bounding plane: e.g., if $x_{iy} <$ floorheight, apply
      $f_i = -k$ (floorheight $- x_{iy}) - c\, \dot{x}_{iy}$ in the negative y-direction, and
      $\tau_i = x_i^{body} \times \{0, -f, 0\}$. There are six planes implemented: a floor, a ceiling, and
      four walls, each oriented along a positive or negative x, y, or z axis.
   c. Coulomb friction for the floor: if $x_{iy} <$ floorheight, compute
      $f_{normal} = f_i \cdot \{0, 1, 0\}$. If $f_{normal} < 0$, compute $\dot{x}_{tangent} = \{\dot{x}_{ix}, 0, \dot{x}_{iz}\}$. If
      $|\dot{x}_{tangent}| < 1/10$, apply $f_i = \mu_s\, f_{normal}\, \dot{x}_i$. Otherwise, apply $f_i = \mu_k\, f_{normal}\, \dot{x}_i$. In
      both cases, $\tau_i = x_i^{body} \times f_i$.
   d. Constant: $f_i = f_{constant}$ and $\tau_i = x_i^{body} \times f_i$.
   e. Tangent: $v = \{0, 0, 1\} \times x_i^{body}$, $f_i = \hat{v}$magnitude, and $\tau_i = x_i^{body} \times f_i$.
   f. Spring: $f_i = \hat{L}(-k\,(L - L_0) - c\,(\dot{x}_{s_i}^{index2} - \dot{x}_{s_i}^{index1}))$ and $\tau_i = x_i^{body} \times f_i$, applied
      positively to one end mass and negatively to the other.
   g. Internal Orientation-Preserving Spring: $f_i = (-k\,(L - L_0) - c\,(\dot{x}_{s_i}^{index2} - \dot{x}_{s_i}^{index1}))$,
      applied positively to one end mass and negatively to the other, and $\tau_i = 0$.
   h. External Orientation-Preserving Spring:
      $f_i = (-k(L - L_0) - c\,(\dot{x}_{s_i}^{index2} - \dot{x}_{s_i}^{index1}))$ and $\tau_i = x_i^{body} \times f_i$, applied positively
      to one end mass and negatively to the other.
   i. Haptics: When the user's effector touches a body, temporary external orientation-
      preserving springs are created between the user's effector-position and the mass-points
      closest to the point of contact. The springs move the body and provide force-feedback
      to the user.

At Step 28, one or more of any of positions, orientations, velocities, and accelerations are calculated for the entity using the calculated plural forces.

Figure 3:
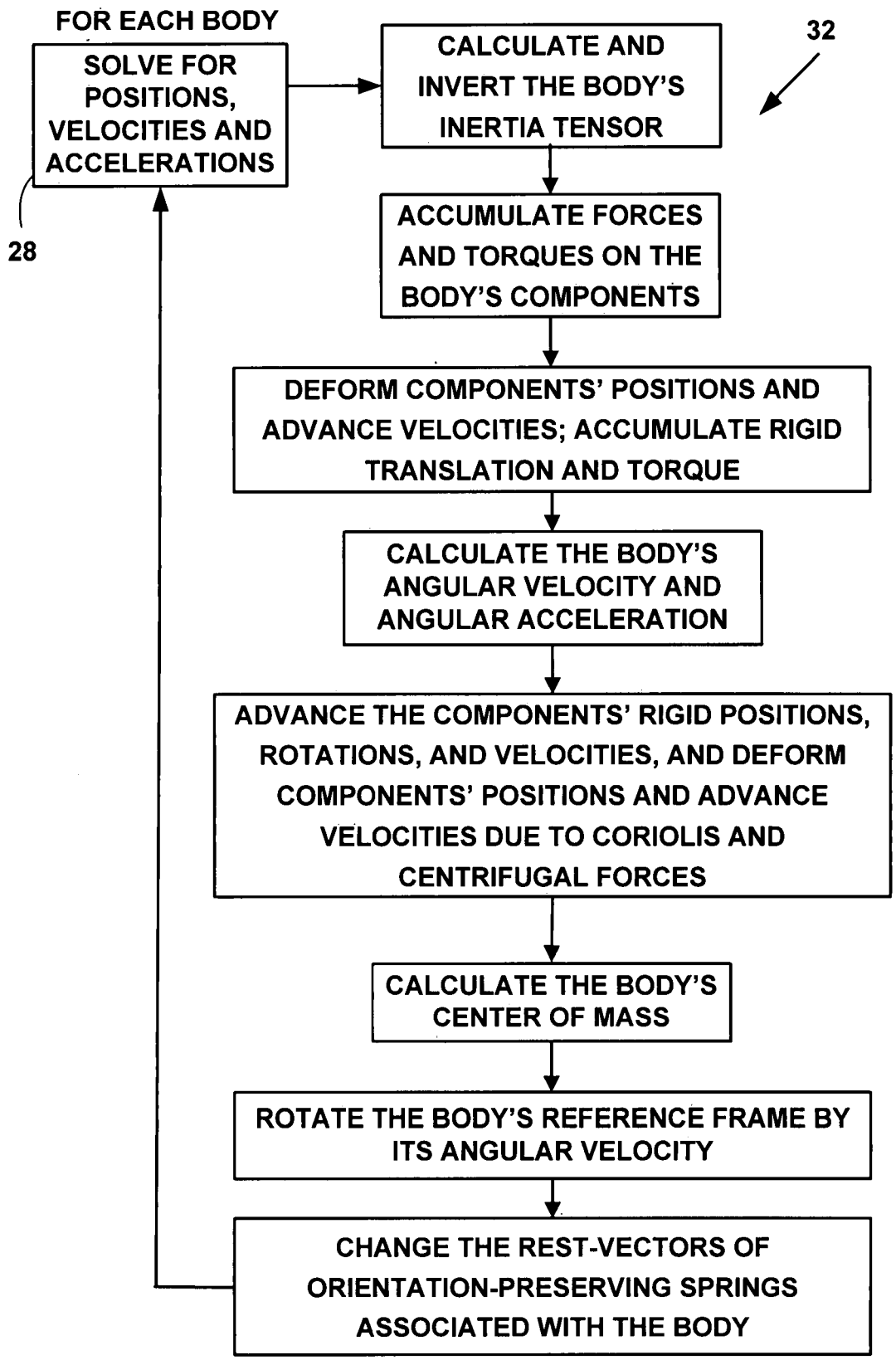
FIG. 3 is a flow diagram illustrating an exemplary method used for Step 28 of the Method of FIG. 2.

FIG. 3 is a flow diagram illustrating an exemplary Method 32 used for Step 28 of Method 22 of FIG. 2. However, the present invention is not limited to using Method 32 and more, fewer and other methods or steps can be used to practice Step 28.

In one exemplary embodiment, the Method 32 includes the steps illustrated in Table 4. However, the present invention is not limited to such an exemplary embodiment, and more, fewer, and other steps and other embodiments can also be used to practice the invention.

TABLE 4

1. Deform components' positions and advance velocities of an entity including a body; accumulate the body's rigid translation and torque.

| | |
|---|---|
| $m_r = \sum_{1}^{n} m_i \mathrm{trans}_i$ | calculate the rigid portion of the body's mass |
| $\ddot{x}_i^f = \dfrac{f_i}{m_i}(1 - \mathrm{trans}_i)$ | calculate the acceleration of each component due to deformation |
| $\ddot{x}_i^r = \dfrac{f_i}{m_r}\mathrm{trans}_i$ | calculate the rigid acceleration of each component |
| $\Delta x_i = \dot{x}_i t + \dfrac{1}{2}\ddot{x}_i^f t^2$ | calculate the change in position of each component due to deformation |
| $\Delta \dot{x}_i = \ddot{x}_i^f t$ | calculate the change in velocity of each component due to deformation |
| $\Delta x_r = \sum_{1}^{n} \dfrac{1}{2}\ddot{x}_i^r t^2$ | calculate the body's change in position for use later |
| $\Delta \dot{x}_r = \sum_{1}^{n} \ddot{x}_i^r t$ | calculate the body's change in velocity |
| $\tau = \sum_{1}^{n} \tau_i$ | calculate the torque on the body |

2. Calculate the body's angular velocity and angular acceleration.

TABLE 4-continued

| | |
|---|---|
| $\mathrm{trans}_r = \dfrac{\sum_{1}^{n} m_i \mathrm{trans}_i}{\sum_{1}^{n} m_i}$ | calculate the force-transmission of the body as a ratio in the range 0-1 |
| $\Delta L = \tau\, \mathrm{trans}_r t$ | calculate the body's change in angular momentum |
| $\omega = I^{-1} L$ | calculate the body's angular velocity |
| $\dot{\omega} = \omega(t) - \omega(t - \Delta t)$ | calculate the body's angular acceleration, for use later |

3. Advance the components' rigid positions, rotations, and velocities, and deform components' positions and advance velocities due to coriolis and centrifugal forces.

| | |
|---|---|
| $x_i^{body} = x_i - x_r$ | calculate the position of each component relative to the center of mass |
| $\dot{x}_i^{body} = \dot{x}_i - \dot{x}_r$ | calculate the velocity of each component relative to the center of mass |
| $\dot{x}_i^{\omega} = \omega \times x_i^{body}$ | calculate the angular velocity of each component as linear velocity |
| $\ddot{x}_i^{centrifugal} = \dot{\omega} \times x_i^{body} + \omega \times \dot{x}_i^{\omega}$ | calculate the centrifugal acceleration of each component |
| $\ddot{x}_i^{coriolis} = 2(\omega \times \dot{x}_i^{body})$ | calculate the coriolis acceleration of each component | calculate the change in position of each component due to the body's change in position, the centrifugal and coriolis accelerations, and the body's angular velocity $$\Delta x_i = \Delta x_r \mathrm{trans}_i - \dfrac{1}{2}(\ddot{x}_i^{centrifugal} + \ddot{x}_i^{coriolis})(1 - \mathrm{trans}_i)t^2 + q(\bar{\omega}, |\omega|) x_i^{body} - x_i^{body}$$

calculate the change in velocity of each component due to the body's change in velocity and the centrifugal and coriolis accelerations $$\Delta \dot{x}_i = \Delta \dot{x}_r \mathrm{trans}_i - (\ddot{x}_i^{centrifugal} + \ddot{x}_i^{coriolis})(1 - \mathrm{trans}_i)t$$

4. Change the body's orientation-preserving spring rest vectors.

TABLE 4-continued $$x_r = \frac{\sum_{1}^{n} x_i m_i}{\sum_{1}^{n} m_i}$$ calculate the position of the body's center of mass $x_i^{ref} = x_i^{undeformed} - x_r^{undeformed}$ recalculate each component's uvw if plastic deformation, contraction, extension, denting, bending, stretching, or other shape-change is required use each component's position relative to the center of mass . . .

$$x_i^{body} = \hat{f}_x(x_i^{ref})_u + \hat{f}_y(x_i^{ref})_v + \hat{f}_z(x_i^{ref})_w$$

. . . to calculate the rest length and orientation of each orientation-preserving spring $$s_i^{L_0} = x_{s_i^{index2}}^{body} - x_{s_i^{index1}}^{body}$$

Figure 4:
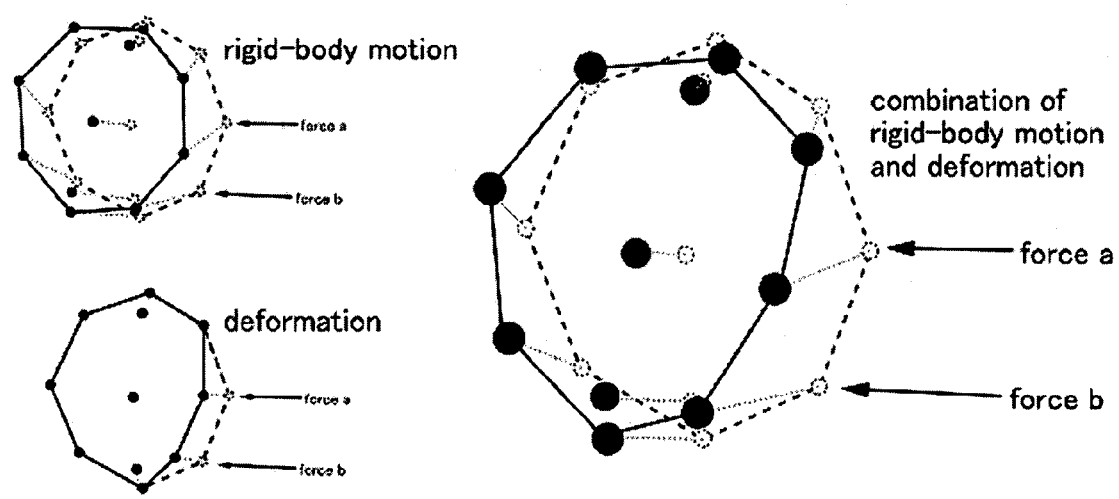
FIG. 4 is a block diagram illustrating a combination of rigid-body motion and deformation to a simulated body.

FIG. 4 is a block diagram 34 illustrating a combination of rigid-body motion and deformation to a simulated body. Forces impact the rigid-body motion and the deformation of the simulated body simultaneously. Dashed bold dots and lines represent the body before forces have been applied and solid bold dots and lines represent the body after the forces have been applied. According to the laws of physics, the method conserves the body's physical properties (including linear and angular momentum) in the absence of external forces.

Figure 5:
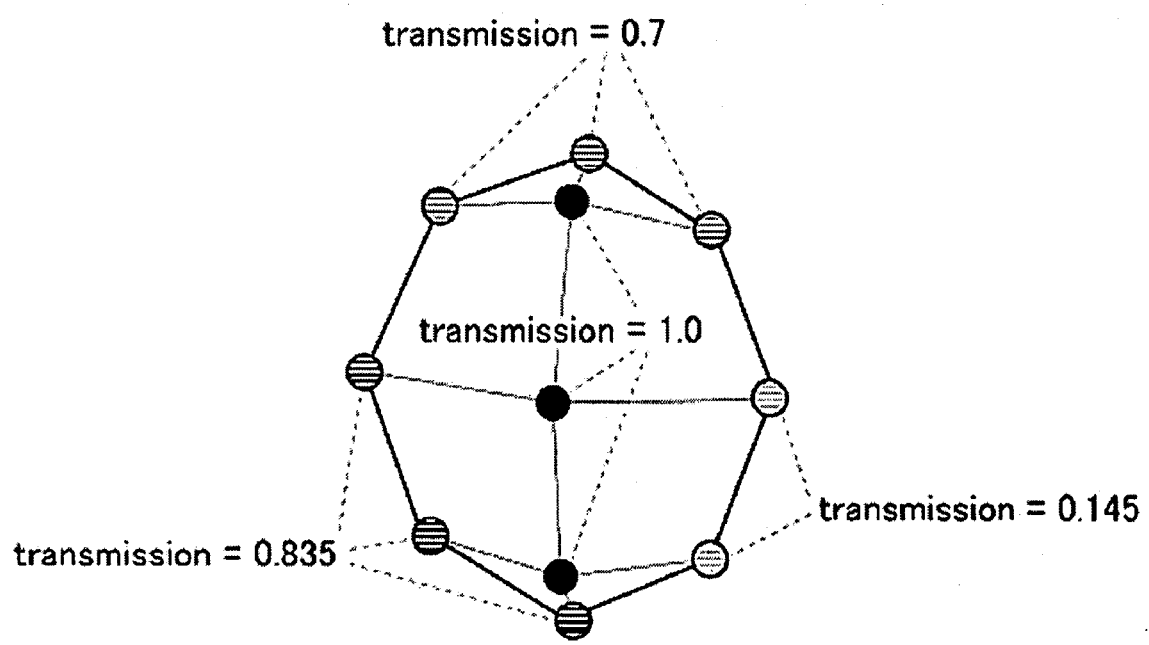
FIG. 5. is a block diagram illustrating a simulated body composed of components with associated masses.

FIG. 5 is a block diagram 36 illustrating a simulated body composed of components with associated masses. A simulated body is composed of components, each component having an associated parameterized force-transmission value.

Figure 6:
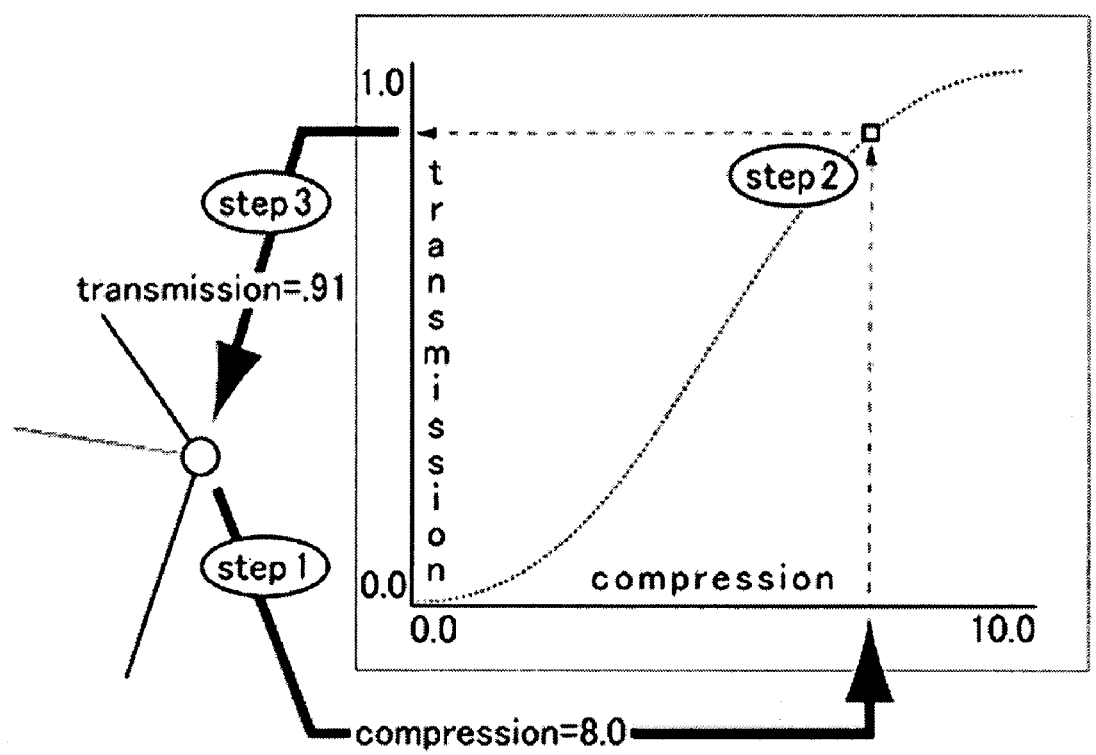
FIG. 6 is a block diagram illustrating changes in a component's force-transmission value.

FIG. 6 is a block diagram 38 illustrating changes in a component's force-transmission value. In Step 1, a time-varying parameter's value is used as input to a specified function. In Step 2, the function's value is calculated. In Step 3, the transmission value is affected by an output of the function.

Figure 7:
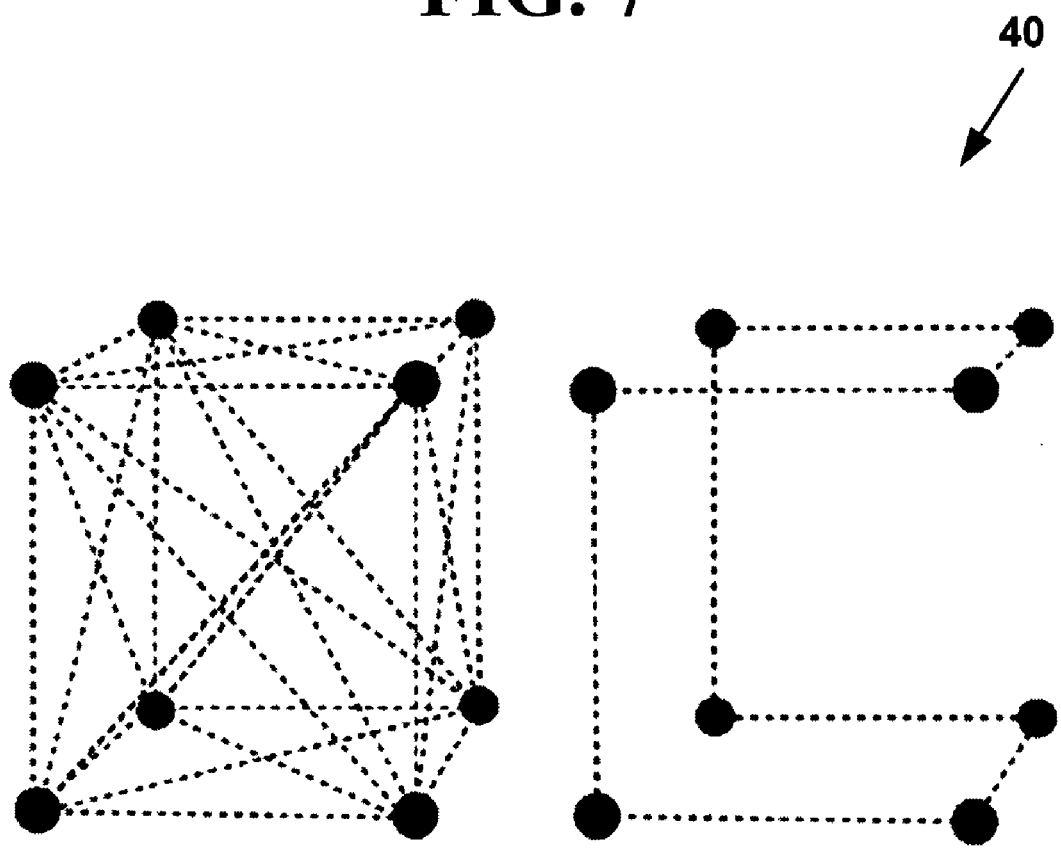
FIG. 7 is a block diagram illustrating standard or orientation-preserving springs that can be used to model a deformable body.

FIG. 7 is a block diagram 40 illustrating standard or orientation-preserving springs that can be used to model a deformable body.

Figure 8:
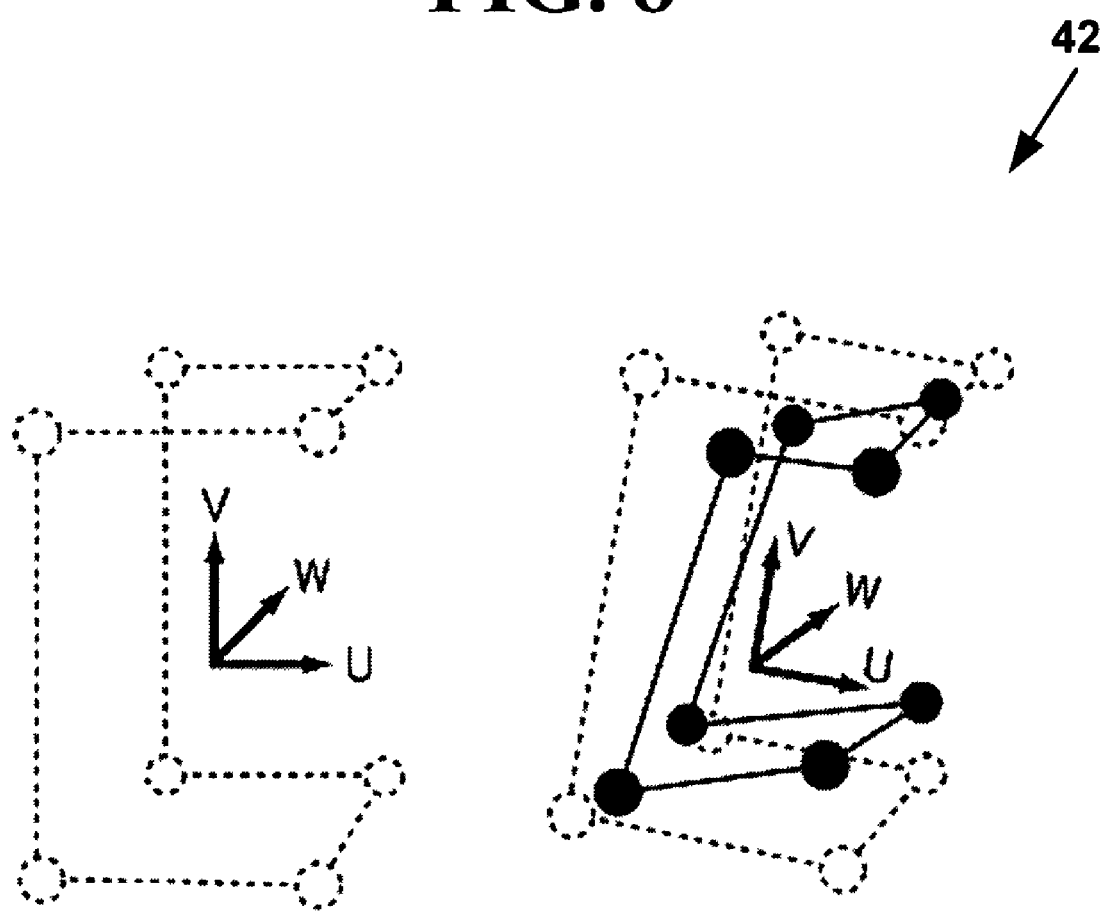
FIG. 8 is a block diagram illustrating a body's local coordinate system or UVW space.

FIG. 8 is a block diagram 42 illustrating a body's local coordinate system or UVW space. The global coordinate system is referred to as "world space." A body's components' locations in UVW space are generally different from the body's components' locations in world space. The components in world space move and deform. The components in UVW space generally do not. The components in UVW space are used to specify both a body's undeformed shape and the rest lengths and orientations of its springs. The solid dots and lines in the rightmost drawing illustrate a deformed body in world space superimposed over the undeformed body in UVW space.

Figure 9:
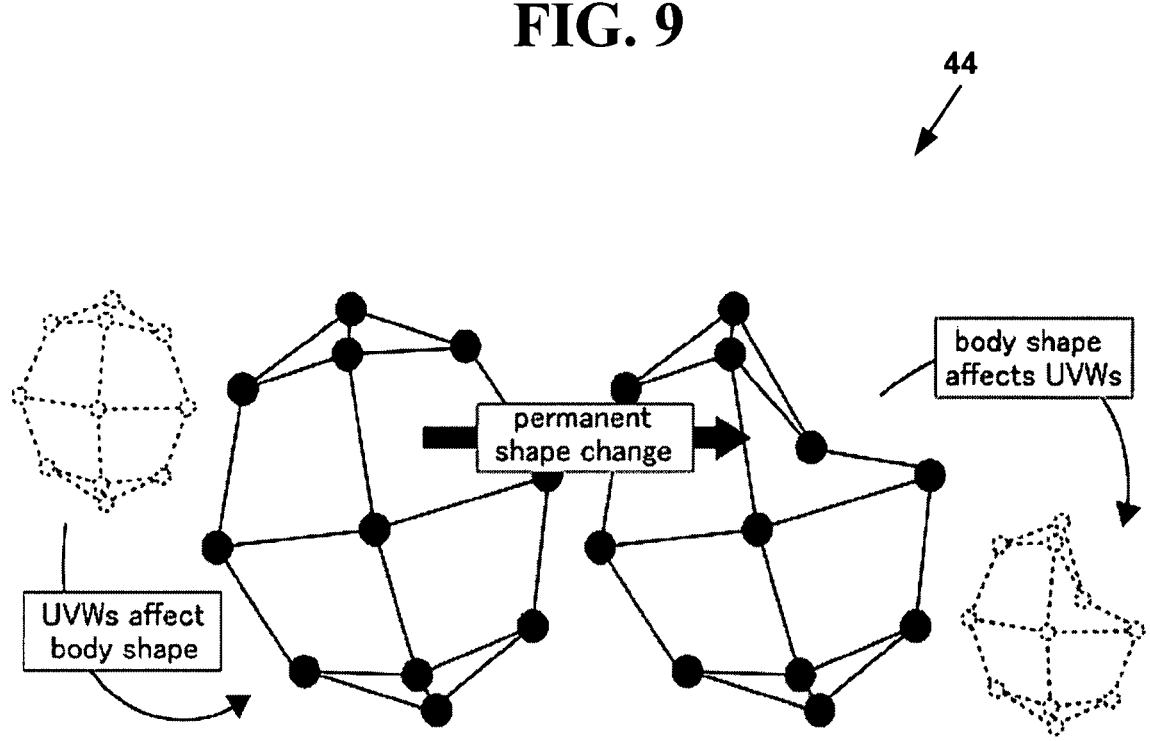
FIG. 9 is a block diagram illustrating a shape change in a body, motivated by an external force, such as a collision with another object.

FIG. 9 is a block diagram 44 illustrating a shape change in a body. A shape change such as plastic deformation, dent, or wrinkle is simulated by modifying the body's undeformed shape in UVW space, and its springs' rest lengths and orientations, in response to the change in shape of the body in world space due to external forces. From left to right, the diagram illustrates the body's components in UVW space, the body's components in world space, the body's deformation in world space due to external forces, and the resulting change in the body's components in UVW space.

Figure 10:
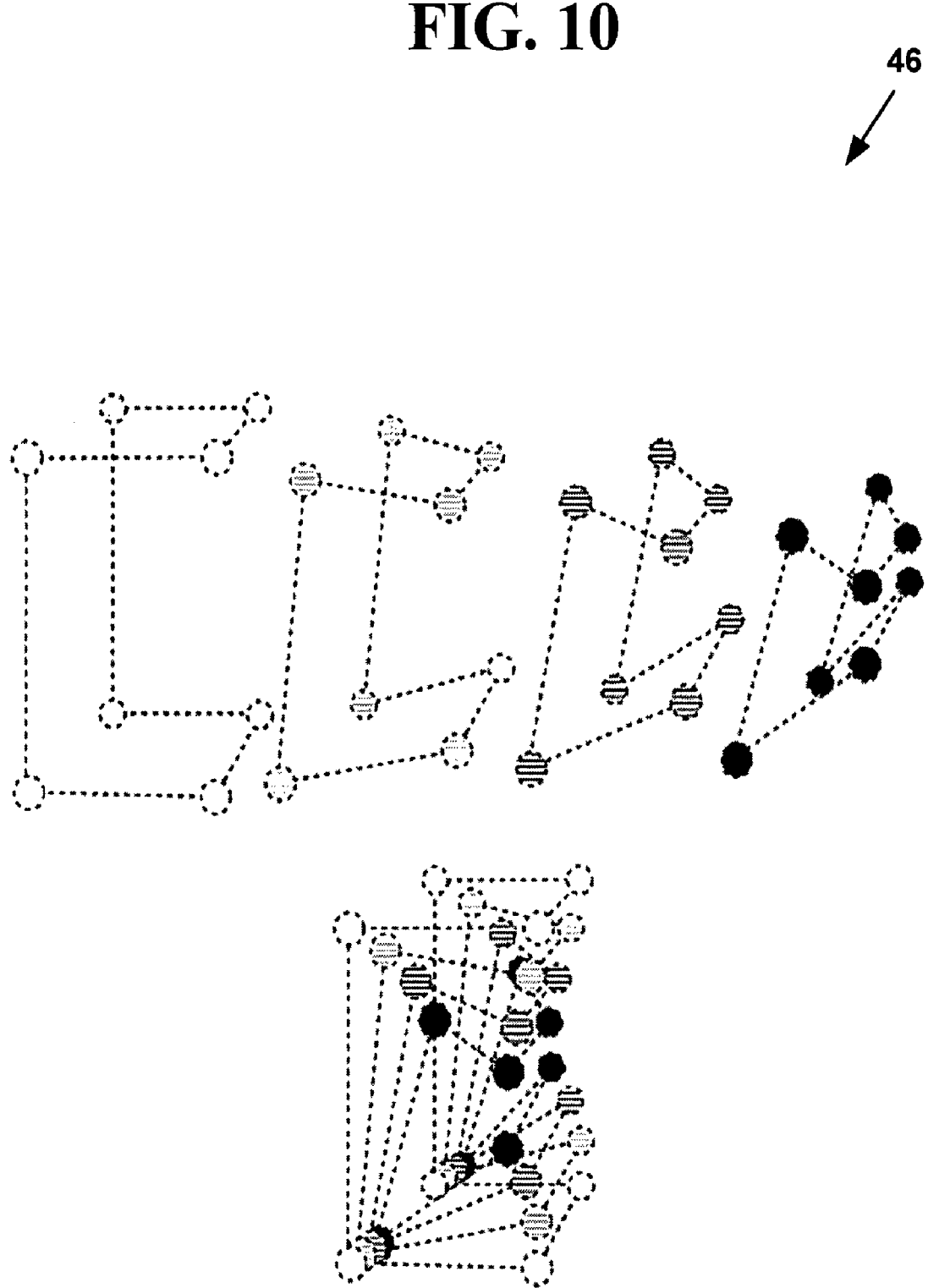
FIG. 10 is a block diagram illustrating a shape change in a body, motivated by an internal force, such as a contraction or extension.

FIG. 10 is a block diagram 46 illustrating another type of shape change in a body. A shape change such as a muscular contraction or extension is simulated by successively modifying the body's undeformed shape in its UVW space over time and consequently modifying its springs' rest lengths and orientations.

Returning to FIG. 2, at Step 30, the calculated one or more positions, and optionally any of velocities, accelerations, and orientations of the entity are used to display zero or more two-dimensional (2D) or three-dimensional (3D) simulated views of one or more representations of the entity or sub-portion thereof. 2D or 3D simulated views may include views of the combined rigid and flexible components of the entity.

Figure 11:
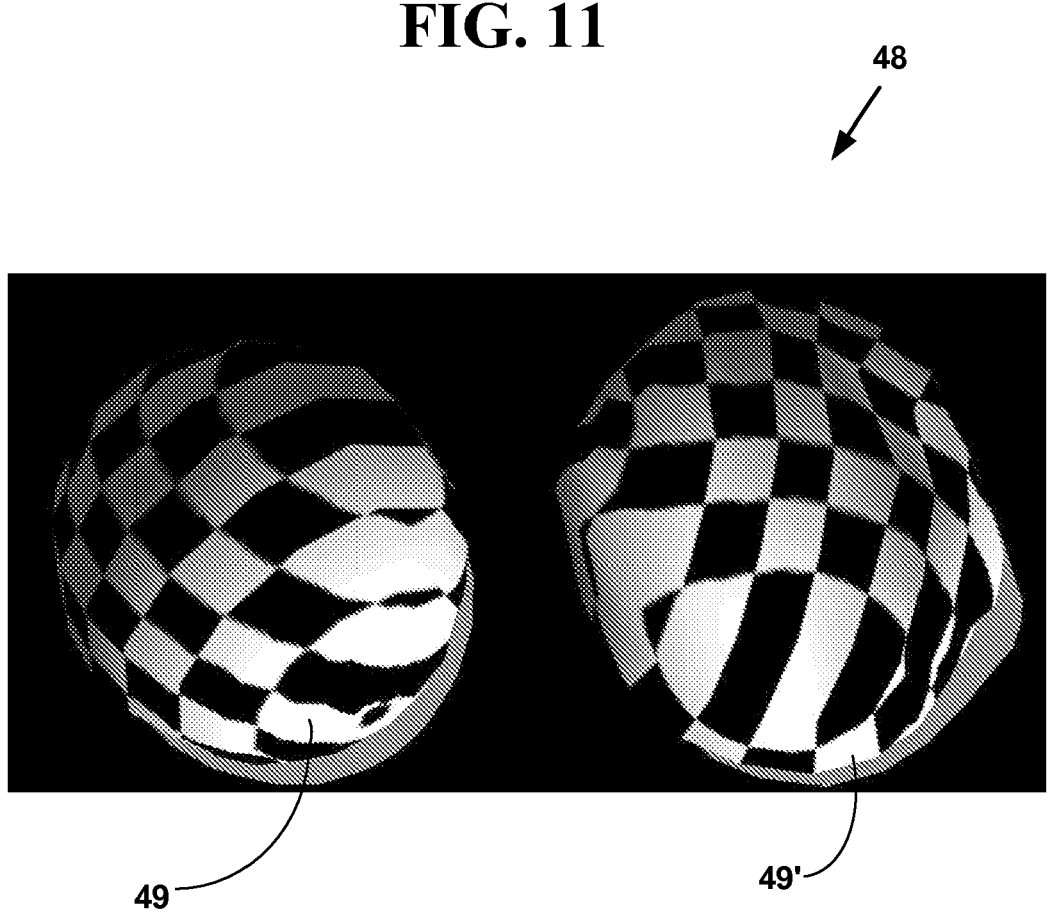
FIG. 11 is a block diagram illustrating a screen shot of a shape change in a body, motivated by an external force.

FIG. 11 is a block diagram of two actual screen shots 48 illustrating a shape change in a body from 49 to 49' motivated by an external generated force using the method and system described herein.

FIG. 12 is a flow diagram illustrating a Method 50 for simulating collisions between entities. At step 52, one or more forces and torques are obtained using a pre-determined method. At Step 54, one or more pre-determined collision detection methods are applied to detect collisions between the simulated objects. At step 56, forces are generated to create collision-free objects. At Step 58, force-transmission values are optionally modified in response to the collisions or other events. At step 60, rigid and flexible masses are calculated.

A method of collision detection between arbitrary surfaces has been created. In one embodiment, the method uses parallel graphics hardware to perform point collision calculations, and reads the resulting data into host CPU memory. It enables the calculation of signed differences between two surfaces at a programmer-specified precision. This method provides speed and indifference to the type of geometry; complex and irregular surfaces are no more computationally expensive than simple cylinders and spheres. In another embodiment, the method of collision detection does not use parallel graphics hardware. This method provides indifference to the type of geometry being used.

Method 50 is illustrated with one exemplary embodiment. However, the present invention is not limited to such an embodiment and other embodiments can also be used to practice the invention.

In one embodiment, Method 50 is included in Method 32 of FIG. 3. However, the present invention is not limited to such an embodiment and other embodiments can also be used to practice the invention.

In this embodiment, Step 52 is equivalent to the corresponding step in Method 32.

At Step 54, one or more pre-determined collision detection methods are applied to detect collisions between the simulated objects.

At Step 56, forces are generated to create collision-free objects. In one embodiment, forces are created to push the colliding objects apart. However, the present invention is not limited to such an embodiment and other embodiments can also be used to practice the invention.

At Step 58, force-transmission values are optionally modified in response to the collisions or other events. This step has the effect of transmitting more or less force from the collision or other events to the rest of the components of the body, which is in turn expressed as rigid motion.

At step 60, rigid and flexible masses are calculated.

In one embodiment, the pre-determined method of step 60 is equivalent to a corresponding step in Method 32 of FIG. 3. However, the present invention is not limited to such an embodiment and other embodiments can also be used to practice the invention.

The handling of forces and masses in the simulation methods described herein create a composite simulation method combining flexible and rigid-body simulation. It is possible, using a combination of rigid-body and flexible methods, to create: (a) flexible bodies that exhibit more accurate rotation; (b) composite structures of rigid, semi-rigid, and flexible components; and (c) specification of the rigidity of a structure (or substructure) with one or more simple interpolation or force-transmission parameters, where fully flexible entails a parameter value of 0.0, and fully rigid, 1.0.

Rigid-body simulation is concerned with inflexible materials, calculating the central position and rotation of a group of nodes. It is inexpensive to calculate from a numerical standpoint, and therefore desirable for real-time simulation. Flexible-body simulation, using springs and nodes, is cheapest to calculate from a numerical standpoint when the springs are not too stiff. It is generally difficult to simulate even semi-rigid materials at interactive rates if there are great numbers of nodes. In the method disclosed herein, we split forces into rigid and flexible portions that are applied to any component with a nonzero force-transmission value in a body. Part of the force applied to such a component will be applied to the other components in the body. The force is split into rigid and flexible portions, and the resulting rigid motion is applied to the other components in ratios that conserve physical properties, such as the body's momentum, and its center-of-mass position in the absence of external forces. Also, the ratio into which the rigid motion is split can be different for each component in the body, so that the rigidities of each of the individual components in the body can vary. This method makes it easier to simulate stiff and semi-rigid materials than with traditional spring-and-dashpot methods.

Spring-dashpot simulation models are typically hard to integrate accurately. Several springs connected to a single component, when excited by forces (such as those in a collision), will give rise to either large counter-forces, which require small time-steps to resolve, or high-frequency vibrations, which also require small time-steps to resolve. Small time-steps are the enemy of real-time simulation. To create 3D structures, springs must be attached to nodes in a lattice, the most efficient of which is a tetrahedral lattice. In a best-case scenario, the number of springs attached to a component in such a lattice will be somewhere between three and twelve, each potentially pushing the component in a different, competing direction.

A more efficient method is obtained by using orientation-preserving springs to simulate flexible bodies. Multiple orientation-preserving springs attached to a component work in concert, rather than in competition. It has been determined experimentally that orientation-preserving spring formulation allows the simulation of a 3D structural lattice at about a cost of half, and sometimes as little as 8%, of its original computation. Another more important effect of the formulation is that orientation-preserving springs can be used to simulate muscle and other materials that expand, contract, or otherwise change shape; these materials are difficult to model because they contain both directed force and mechanical properties that are not addressed by standard spring equations, whereas orientation-preserving springs incorporate both.

FIG. 13 is a flow diagram illustrating a Method 62 for use of orientation-preserving springs for creating a permanent or semi-permanent shape change in a material or body. At Step 64, one or more orientation-preserving springs are used between components of an entity. At Step 66, a rest-vector of the one or more orientation-preserving springs is modified. The one or more rest-vectors of the orientation-preserving springs are modified as a result of any of: a) one or more collisions, b) a plastic change in a material due to internal or external forces, c) a response to user input, or a combination thereof.

FIG. 14 is a flow diagram illustrating a Method 68 for assigning a normalized damping value of a spring, the normalized value being defined by a value such that no damping maps to a zero value, underdamping maps to values less than one, critical-damping maps to the value one, and overdamping maps to values greater than one. As an initialization Step 70, normalized damping values are assigned to a spring's end-components. To compute the damping of a spring, at Step 72, the masses of the components at the spring's ends are obtained. At Step 74, the reduced-mass of the springs' end-components is calculated. At Step 76, one or more unnormalized (or actual) damping values of the spring are calculated using the assigned normalized damping values of the spring's end-components and the reduced mass of the end-components.

Methods 62 and 68 may be used independently or substituted for steps in other methods described herein that use orientation-preserving springs and damped springs respectively.

The method and system described herein can use orientation-preserving springs that are differentiated by type. Different formulations are used depending upon whether an orientation-preserving spring is internal or external to a body.

The method and system exhibits at least some of the following features. The method and system may have additional features, and is not limited to the features described here.

Interaction: allowing a user and the simulation to mutually act upon each other, at time intervals small enough to be perceived as continuous.

Direct manipulation: giving a user the perception that he or she is interacting with an actual object that is present in the same space as the user (as opposed to the perception that the object is on a display screen connected to a computer.)

Variable hardness: the ability for the simulation to specify, control, or change the force response of a body or sub-portion thereof, by allowing interpolation between a springlike force response and a rigid force response.

Improved stability: increasing the step-size used to stably simulate bodies, thereby speeding up the simulation. This is done by using improved equations and numerical methods, by reducing the number of springs necessary to construct a body, and by changing the way forces are used to simulate a body.

Decreased data requirements: allowing a body to be simulated using fewer elements than traditional methods.

More accurate rotation: methods for calculating body rotations that are improvements over those inherent in spring and dashpot simulations.

Adherence to conservation laws: obeying the laws of physics, thereby making it possible to apply standard forces to simulated materials without modifying their equations, translating them into another form, or correcting their positions or motions.

Anisotropy: the ability of a body's masses to have different responses, in both their force-transmissions and the springs' various parameters, depending upon the direction a mass is pushed relative to the body.

Heterogeneity: the ability of one body to contain several different materials, including those that are of different hardness. Also, the ability of different bodies to represent materials of different hardness.

Volume and/or area preservation: where either the surface-area of a deformable body remains constant, or its volume remains constant. In the method and system, volume or area can be preserved or ignored. This allows the simulation of both incompressible and compressible materials.

Structural neutrality: where no ordering, connectivity, element size, shape, distance, or any specific layout need be imposed when creating a body. Bodies can be created from point, linear, surface, or volumetric data in any number of ways.

Lack of precomputation: where no precomputed data is required to simulate a body.

Nonlinearity: the ability to simulate materials that have nonlinear force responses.

Dynamic properties: the ability to simulate objects that are not in equilibrium. Examples include stretching, bending, expansion, extension, and contraction.

Example Dataflow and Workflow for Simulation System

TABLE 5

COMPONENTS OF AN EXEMPLARY SIMULATION SYSTEM 10

3D model data, representing the object(s) to be simulated
A computer on which to run the simulation
Mechanical material properties data, possibly gathered in advance, that contain any of mass, elastic, and other properties of the materials to be simulated
Instrumentation that associates material properties data with each of the 3D models
Physical simulation code that causes the 3D models to react appropriately to internal and external stimuli
A display engine similar to that used in the videogame and animation industries; used by the computer to draw the 3D models over and over again at a frame-rate of 20 times a second or more
Display devices such as screen(s) or monitor(s) on which to display the 3D models
Haptic devices that sense hand or other motion from a user and "push back", allowing the feel of material resistance and motion
Head-tracking hardware to let the computer know from where the user is looking, and tell the display engine to render the object(s) from that point of view
Stereoscopic glasses 17 or other 3D display hardware to give the illusion of depth
Positional audio to generate sound associated with the imagery What follows is how an exemplary system 10 works, routes and uses various data, and renders various modes of output to a user. However, the present invention is not limited to such an exemplary embodiment and other embodiments can also be used to practice the invention.

First, 3D model data is created by an artist in a modeling package on a computer, or alternately acquired onto the computer using a scanner, such as laser range scanner, computed tomography (CT) imager, magnetic resonance imaging (MRI) device, or another method. The result is a data file or files.

If scanned data is acquired, a preprocessing step is used to compute triangulated model data via a segmentation method or alternate method. The result is a data file or files.

A database of material properties is created. The data can be acquired using manual input, measurement instruments, MRI, CT, ultrasound, previously published data, or other methods.

The material properties and 3D model data are loaded into a computer simulation program.

Methods, manual or interactive specification from a user, pre-calculated data maps, or other methods are used to associate the material property data with the 3D model data. The 3D models are instrumented with any of rigid, semi-rigid, and flexible components for physical simulation, using the material properties as a guide. The result is either a data file or files, or an internal data structure or structures associating components of the 3D model data with material property data.

The simulation program then uses the instrumented 3D models to run a simulation 22 of the materials in the model, utilizing mathematical and physics equations to determine how the materials should move.

The computer simulation program continually gathers input from the user via haptic 13 and tracking devices 11 attached to the computer 12.

The computer simulation program continually displays a representation of the 3D model data to a user on a computer monitor or projection screen 14. The representation may be displayed stereographically, continuously generating a separate image for each of the user's eyes. The models are drawn on the display 14 at a frame-rate of 20 times per second or more. The user's head position is tracked 11, and the computer 12 draws the models from the user's point of view; in combination with 3D glasses 17, this gives the illusion that objects are "really there", as the user can look around and into them.

A representation of tool(s) (also a 3D model) is drawn along with the 3D model data. When the user moves a haptic or position-sensing device 13, the position of the device is sensed and used to reposition the tool model.

The computer simulation program continuously simulates the motion of and updates the 3D model data using the methods described herein. It uses the input from the user and the material property data, along with other forces specified in the simulation, such as gravity, to generate forces which move the model.

The computer simulation program also continuously outputs haptic force data to the haptic devices 13 attached to the computer 12, allowing the user to feel the 3D model and its movements. Collisions are calculated between the tool model and the 3D models in the simulation. As the forces in the simulation are computed, the ones affecting the tool are sent to the effectors in the haptic device 13 and the user feels the effectors' pushing and pulling as the resistance and motion of the models.

The computer simulation program may also output audio, including continuous and event-based, positional and environmental, and other forms. The audio may be used as cues, for providing information and guidance, as music, and for other reasons.

The program may also use the user's spoken audio as commands, requests, communication with other users, and for other reasons. Commands may also be typed via a keyboard, or issued in other ways.

Because the interactions are simulated, visuals may be augmented with informational displays, such as highlighting where contact occurs between an object and a tool, and other methods.

The method and system described herein allow the creation of a mathematical simulation of materials, and a representation of the contact forces that occur during real-world situations. The simulated material components may be generated from any of point, surface (e.g., modeling software, laser range scanner, stereo video capture device, 3D digitizer, or other device), volumetric (e.g., CT, MRI, or other device), and mechanical material properties data. A force-transmission value is computed for each component. The method and system allows virtual representations of models to be constructed and used in a simulation 10. The resulting contacts with the simulated objects may be seen and felt by a user, as if they were interacting with real objects, via computer-generated visuals 19 and haptic (touch) feedback 13.

An off-line simulation, during which interactive user input may not be a component of the simulation, and neither real-time nor any other display of the materials is required, can also be effected.

It should be understood that the programs, processes, methods and system described herein are not related or limited to any particular type of computer, display, or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for simulating rigid, semi-rigid, and flexible components of materials comprising:
   (a) defining on a network device with one or more processors, one or more individual components for each of one or more entities being simulated, wherein a three-dimensional (3D) entity includes at least four individual components combined into the 3D entity being simulated;
   (b) defining for each of the one or more individual components, a force transmission parameter obtained from a plurality of force transmission parameter values, such that a selected entity's rigid mass is greater than zero and less than its total mass, the plurality of force transmission parameter values including a first force transmission parameter value representing a fully flexible component, a second force transmission parameter value representing a fully rigid component and a plurality of other force transmission parameter values with values in-between the first force transmission parameter value and the second force transmission parameter value representing varying levels of semi-rigidity, wherein the selected entity's rigid mass is calculated according to the equation:

$$m_r = \sum_1^n m_i trans_i,$$

wherein $m_r$ is the rigid mass, $m_i$ represents mass of one of the selected entity's individual components, and $trans_i$ is an individual component's corresponding force transmission parameter value;

(c) combining a method for simulating flexible entities with a method for simulating rigid entities into a composite simulation method, the composite method including each entity being simulated comprising one or more individual components and each individual component being individually defined with a separate force transmission parameter value, allowing each entity being simulated to include any combination of rigid, semi-rigid and flexible components, simulating either similar materials or composites of different materials, wherein the method for simulating flexible entities that has been combined uses a model comprising individual point-masses connected by idealized springs or dashpots, wherein the one or more individual components are represented by the point-masses, wherein in the composite simulation method, an acceleration due to rigid motion is calculated according to the equation:

$$\ddot{x}_i^r = \frac{f_i}{m_r} trans_i,$$

wherein in the composite simulation method, an acceleration due to deformation is calculated according to the equation:

$$\ddot{x}_i^f = \frac{f_i}{m_i}(1 - trans_i),$$

wherein $f_i$ is a force applied to an individual component, $\ddot{X}_i^r$ is the acceleration due to rigid motion, and $\ddot{X}_i^f$ is the acceleration due to deformation;

(d) obtaining with the composite simulation method on the network device a plurality of positions, velocities, and accelerations and a defined force transmission parameter value for each of the one or more individual components of each of the one or more entities being simulated;
   (e) calculating with the composite simulation method on the network device a plurality of forces and torques being applied on the one or more individual components of each of the one or more entities being simulated using the obtained positions, velocities or accelerations;
   (f) calculating with the composite simulation method on the network device one or more of new positions, velocities, and accelerations of the one or more individual components of each of the one or more entities being simulated using the calculated plurality of forces and torques and the one or more defined force transmission parameters; and
   (g) displaying in real-time with the composite simulation method on a graphical user interface with one or more graphical windows on a graphical display the calculated one or more positions and any of the calculated one or more velocities or accelerations as a two-dimensional (2D) or a three dimensional (3D) graphical object view of a representation of each of the one or more entities being simulated and presenting in real-time the composite simulation method's results as a haptic output on one or more haptic devices on the network device.

2. A non-transitory computer readable medium having stored therein instructions for causing the one or more processors to execute steps (a) through (g) of the method of claim 1.

3. The method of claim 1 wherein the composite simulation method includes a combination of a rigid-body method and a spring-and-dashpot method.

4. The method of claim 1 wherein the composite simulation method includes a combination of a rigid-body method and a finite-element method.

5. The method of claim 1 wherein the one or more individual components for each of one or more entities being simulated are simulated using a method for simulating flexible components including hookian springs.

6. The method of claim 1 wherein the one or more individual components for each of one or more entities being simulated are simulated using the method for simulating flexible entities including a method comprising a single type of orientation-preserving springs.

7. The method of claim 6 wherein any of the orientation-preserving springs' rest-vectors are changed over time.

8. The method of claim 1 wherein the one or more individual components for each of one or more entities being simulated are simulated using the method for simulating flexible entities including a method comprising one or more types of orientation-preserving springs.

9. The method of claim 8 wherein the one or more types of orientation-preserving springs include using different types of simulated orientation-preserving springs depending upon whether or not an orientation-preserving spring is internal or external to a single body portion or a plurality of body portions of an entity being simulated.

10. The method of claim 9 wherein internal orientation-preserving springs do not apply torques to a single body portion or a plurality of body portions of an entity being simulated.

11. The method of claim 8 wherein the one or more types of orientation-preserving springs are used for creating dynamic motion in an entity being simulated comprising:
using one or more orientation-preserving springs between components of the entity being simulated for creating dynamic motion; and
changing a rest-vector of one or more orientation-preserving springs over time.

12. The method of claim 11 wherein one or more rest-vectors of the one or more orientation-preserving springs are changed over time according to any of:
a) predetermined key-frame positions,
b) tables of data or functions residing in a computer database or memory,
c) response to user input, or a combination thereof.

13. The method of claim 8 further comprising:
using one or more orientation-preserving springs between components of an entity being simulated; and modifying a rest-vector of one or more orientation-preserving springs.

14. The method of claim 13 wherein the one or more orientation-preserving springs' one or more rest-vectors are modified as a result of any of:
a) one or more collisions,
b) a plastic change in a material due to internal or external forces,
c) a response to user input, or a combination thereof.

15. The method of claim 8 further comprising:
defining and assigning to a selected type of spring a normalized value representing damping of the spring, such that a normalized value of zero represents an absence of damping, a normalized value of less than one represents underdamping, a normalized value of one represents critical damping, and a normalized value of greater than one represents overdamping; and
using the assigned normalized value to calculate the spring's actual damping value, so that the spring exhibits a damping response specified by the normalized value.

16. The method of claim 1 wherein step (e) further includes:
a body for an entity being simulated with one or more components each including a defined force transmission parameter value; and calculating:
a first portion of a body's body mass that moves in a rigid manner, and by inference, a second portion of the mass of the body that deforms independently of the body, using defined force transmission parameters values associated with each of the one or more components of the body;
a partial acceleration of each component of the body that is independent of a motion of the body as a whole, and a partial acceleration of each component of the body that is due to an acceleration of the body as a whole; an independent change in position and velocity of each of the body's components, due to deformation (A);
a change in position and velocity of the body as a whole, due to a rigid motion (B);
a position and velocity of each of the body's components relative to the body's center-of-mass; and
an actual change in position and velocity of each of the body's components, including both (A) and (B), and all component force transmission parameter values.

17. The method of claim 1 wherein step (f) further includes:
a body for an entity being simulated with one or more components each including a defined force transmission parameter value; and calculating:
a total torque on the body;
an amount of force transmission of the body;
a body change in angular momentum, involving the amount of force transmission of the body;
a body angular velocity (A) and angular acceleration;
a linearized angular velocity of each of the one or more components of the body or centrifugal and coriolis accelerations of each of the one or more components of the body both collectively donated (B);
a change, due to rotation, in position and velocity of each of the one or more components of the body, including (A) or (B), and each component's force transmission parameter value; and
a change in orientation of the body's orthonormal basis reference frame.

18. The method of claim 1 wherein the defined force transmission parameter values of one or more individual components of an entity being simulated are changed over time.

19. The method of claim 18 wherein the change in the force transmission parameter values of one or more individual components of an entity being simulated is changed over time due to any of:
a) physical properties of a material under compression,
b) response to external forces,
c) tables of data or functions residing in a computer database or memory,
d) response to user input, or a combination thereof.

20. The method of claim 1 wherein an entity being simulated includes a component of a human body.

21. The method of claim 20 wherein the component of the human body includes any of muscle, bone, and connective tissue.

22. The method of claim 1 wherein step (d) further includes:
obtaining one or more of positions, velocities or accelerations of the one or more haptic devices on the network device that sense any of positional information, rotational information, hand motion, and other motion from a user input and return one or more resistive or push-back forces to the user on the one or more haptic devices, allowing a feel of any of resistance, collision, penetration, separation, cutting, tearing, breakage, and other motions of one or more materials of an entity being simulated.

23. The method of claim 1 further comprising:
applying with the composite simulation method on the network device a pre-determined collision detection method to detect collisions between any of one or more representations of the one or more haptic devices and the one or more individual components for each of the one or more entities being simulated to create collision-free representations of the one or more haptic devices and collision-free representations of the one or more individual components for each of the one or more entities being simulated.

24. The method of claim 1 further comprising storing physical information about a 3D model in its color data, such that each component of a four-component color maps to one of the physical quantities of mass, stiffness, damping, and force transmission.

25. A system for providing absolute positional and rotational registration of an entity being simulated on one or more graphical display devices, one or more haptic or other position sensing devices, and one or more viewpoint tracking devices, comprising in combination:
means for rigidly and physically connecting one or more display devices including one or more graphical display devices or audio devices to a mechanical linkage or harness;
means for rigidly and physically connecting one or more haptic devices to the mechanical linkage or harness; and
means for rigidly and physically connecting one or more viewpoint tracking devices to the mechanical linkage or harness; and
means for registering during the simulation, the one or more display devices, the one or more haptic or position-sensing devices, and the one or more tracking devices as hardware components to control the entity being simulated during the simulation and the aligning the hardware components for interacting with the entity being simulated during the simulation,
wherein the means for registering implements the method according to claim 1.

26. The system of claim 25, further comprising means for rigidly and physically connecting one or more devices including one or more graphical display devices or audio devices, one or more haptic devices, and one or more viewpoint tracking devices to a mechanical linkage by which the one or more devices are dynamically repositioned during a simulation, new positions being dynamically reported in real time by mechanical or other sensors.

27. The system of claim 25, further comprising:
means for registering during the simulation, the one or more graphical display devices, the one or more haptic devices and one or more tracking devices worn by one or more users to control the one or more entities being simulated and aligning hardware components for interacting with virtual objects encountered during the simulation.

28. A system for simultaneously simulating rigid, semi-rigid and flexible components of an entity, comprising in combination:
means for defining on a network device with one or more processors, one or more individual components for each of one or more entities to be simulated, wherein a three-dimensional (3D) entity includes at least four individual components combined into the 3D entity being simulated;
means for defining for each of the one or more individual components, a force transmission parameter obtained from a plurality of force transmission parameter values, such that an entity's rigid mass is greater than zero, and less than its total mass, the plurality of force transmission parameter values including a first force transmission parameter value representing a fully flexible component, a second force transmission parameter value representing a fully rigid component and a plurality of other force transmission parameter values with values in-between the first force transmission parameter value and the second force transmission parameter value representing varying levels of semi-rigidity, wherein the selected entity's rigid mass is calculated according to the equation:

$$m_r = \sum_1^n m_i trans_i,$$

wherein $m_r$ is the rigid mass, $m_i$ represents mass of one of the selected entity's individual components, and $trans_i$ is an individual component's corresponding force transmission parameter value;
means for combining a method for simulating flexible entities with a method for simulating rigid entities into a composite simulation method, the composite method including each entity being simulated comprising one or more individual components and each individual component being individually defined with a separate force transmission parameter value, allowing each entity being simulated to include any combination of rigid, semi-rigid and flexible components, simulating either similar materials or composites of different materials, wherein the method for simulating flexible entities that has been combined uses a model comprising individual point-masses connected by idealized springs or dash-pots, wherein the one or more individual components are represented by the point-masses, wherein in the composite simulation method, an acceleration due to rigid motion is calculated according to the equation:

$$\ddot{x}_i^r = \frac{f_i}{m_r} trans_i,$$

wherein in the composite simulation method, an acceleration due to deformation is calculated according to the equation:

$$\ddot{x}_i^f = \frac{f_i}{m_i}(1 - trans_i),$$

wherein $f_i$ is a force applied to an individual component, $\ddot{X}_i^r$ is the acceleration due to rigid motion, and $\ddot{X}_i^f$ is the acceleration due to deformation;

means for obtaining with the composite simulation method on the network device a plurality of positions, velocities, and accelerations and a defined force transmission parameter value for each of the one or more individual components of each of the one or more entities being simulated;

means for calculating with the composite simulation method on the network device a plurality of forces and torques being applied on the one or more individual components of each of the one or more entities being simulated using the obtained positions, velocities or accelerations;

means for calculating with the composite simulation method on the network device one or more of new positions, velocities, and accelerations of the one or more individual components of each of the one or more entities being simulated using the calculated plurality of forces and torques and the one or more defined force transmission parameters; and means for displaying in real-time with the composite simulation method on a graphical user interface with one or more graphical windows on a graphical display the calculated one or more positions and any of the calculated one or more velocities or accelerations as a two-dimensional (2D) or a three dimensional (3D) graphical object view of a representation of each of the one or more entities being simulated and representing in real-time the composite simulation method's results as a haptic output on one or more haptic devices on the network device.

29. The system of claim 28, further comprising:

means for rigidly and physically connecting and dynamically moving during a simulation and registering with respect to each hardware component of the simulation, with the composite simulation method on the network device one or more display devices, one or more position-sensing devices, and one or more tracking devices to control the one or more entities being simulated.

30. The system of claim 28 further comprising:

means for obtaining or calculating a plurality of positions, velocities, and accelerations for combined rigid and flexible components of an entity being simulated using a spring and dashpot model for the flexible simulation method of the composite simulation method on the network device;

means for calculating a plurality of forces and torques on an entity being simulated using any of the obtained positions, velocities and accelerations with the composite simulation method on the network device;

means for calculating one or more of any of positions, velocities or accelerations of an entity being simulated and its components using the calculated plurality of forces and torques with the composite simulation method on the network device; and means for displaying on the graphical user interface with the plurality of graphical windows on the graphical display on the network device with the composite simulation method a two-dimensional (2D) or three-dimensional (3D) simulation view, wherein the view may contain a representation of any of the one or more entities being simulated, their components, or subportions thereof on an audio, on the one or more haptic devices, or on position-sensing devices on the network device.

* * * * *